United States Patent [19]

Ichihashi et al.

[11] Patent Number: 5,455,568
[45] Date of Patent: Oct. 3, 1995

[54] SELECTIVE COMMUNICATION SYSTEM HAVING SEPARATE CONNECTION CIRCUITS BETWEEN COMMUNICATION DEVICES

[75] Inventors: Tatsuki Ichihashi; Yoshimasa Baba; Shoichiro Seno; Shigeru Aoyama, all of Kanagawa, Japan

[73] Assignee: Mitsubishi Denki Kabushiki Kaisha, Tokyo, Japan

[21] Appl. No.: 284,438

[22] Filed: Dec. 14, 1988

[30] Foreign Application Priority Data

Dec. 15, 1987 [JP] Japan ................................ 62-316552
Feb. 26, 1988 [JP] Japan ................................ 63-43608

[51] Int. Cl.$^6$ .................................................. H01H 67/00
[52] U.S. Cl. ................ 340/825.02; 340/825.03
[58] Field of Search ............................ 370/94.3, 79, 80, 370/60, 60.1, 16, 79, 80, 85.7, 95.1; 340/825.02, 825.08, 827, 825.03, 825, 825.04, 825.5, 825.51; 364/148, 949.91, 949.92, 949.93, 949.41, 900; 371/11.1, 11.2, 11.3; 307/112, 113; 455/88, 103; 379/219, 220, 272

[56] References Cited

U.S. PATENT DOCUMENTS

| 4,068,097 | 1/1978 | Verriest . | |
| 4,071,908 | 1/1978 | Brophy et al. | 340/825.02 X |
| 4,388,683 | 6/1983 | Beifuss . | |
| 4,427,968 | 6/1984 | York | 340/825.02 X |
| 4,470,154 | 9/1984 | Yano | 455/607 |
| 4,470,154 | 9/1984 | Yano | 455/609 |
| 4,486,750 | 12/1984 | Aoki | 340/825 |
| 4,656,628 | 4/1987 | Tan . | |
| 4,675,668 | 6/1987 | Ise et al. | 340/825.08 |
| 4,692,917 | 9/1987 | Fujioka | 370/60 |
| 4,707,828 | 11/1987 | Yamada | 370/85 |
| 4,763,329 | 8/1988 | Green | 340/825.02 X |
| 4,783,657 | 11/1988 | Bouchard et al. | 340/825.03 X |

FOREIGN PATENT DOCUMENTS 2159377  11/1985  United Kingdom ............. 340/825.02

OTHER PUBLICATIONS

*IEEE Communications Magazine*. vol. 22, No. 11, Nov. 1984, US pp. 41–47; J. Hahn et al.; "Packet Radio Network Routing Algorithms: A Survey".
Dalal et al., "Reverse Path Forwarding of Broadcast Packets", ACM, Dec. 1978, vol. 21, No. 12, pp. 1040–1048.
Uyless Black, *Computer Networks*, Prentice–Hall Inc., 1987, pp. 131–144.

*Primary Examiner*—Ulysses Weldon
*Attorney, Agent, or Firm*—Rothwell, Figg, Ernst & Kurz

[57] ABSTRACT

A transmitting-receiving unit or a set of upper rank transmitting-receiving units and lower rank transmitting-receiving units are provided, and one or a plurality of circuits selected by a circuit selective switch unit from among many circuits are connected to the transmitting-receiving unit or the set. As a result, the burden of the control unit provided in the communication device is reduced. The maintenance of a route table which is used in transmitting packets from the highest rank station to the lowest rank station via other communication devices is made unnecessary by transferring the route table in order from the highest rank stations to the lowest rank stations.

5 Claims, 19 Drawing Sheets

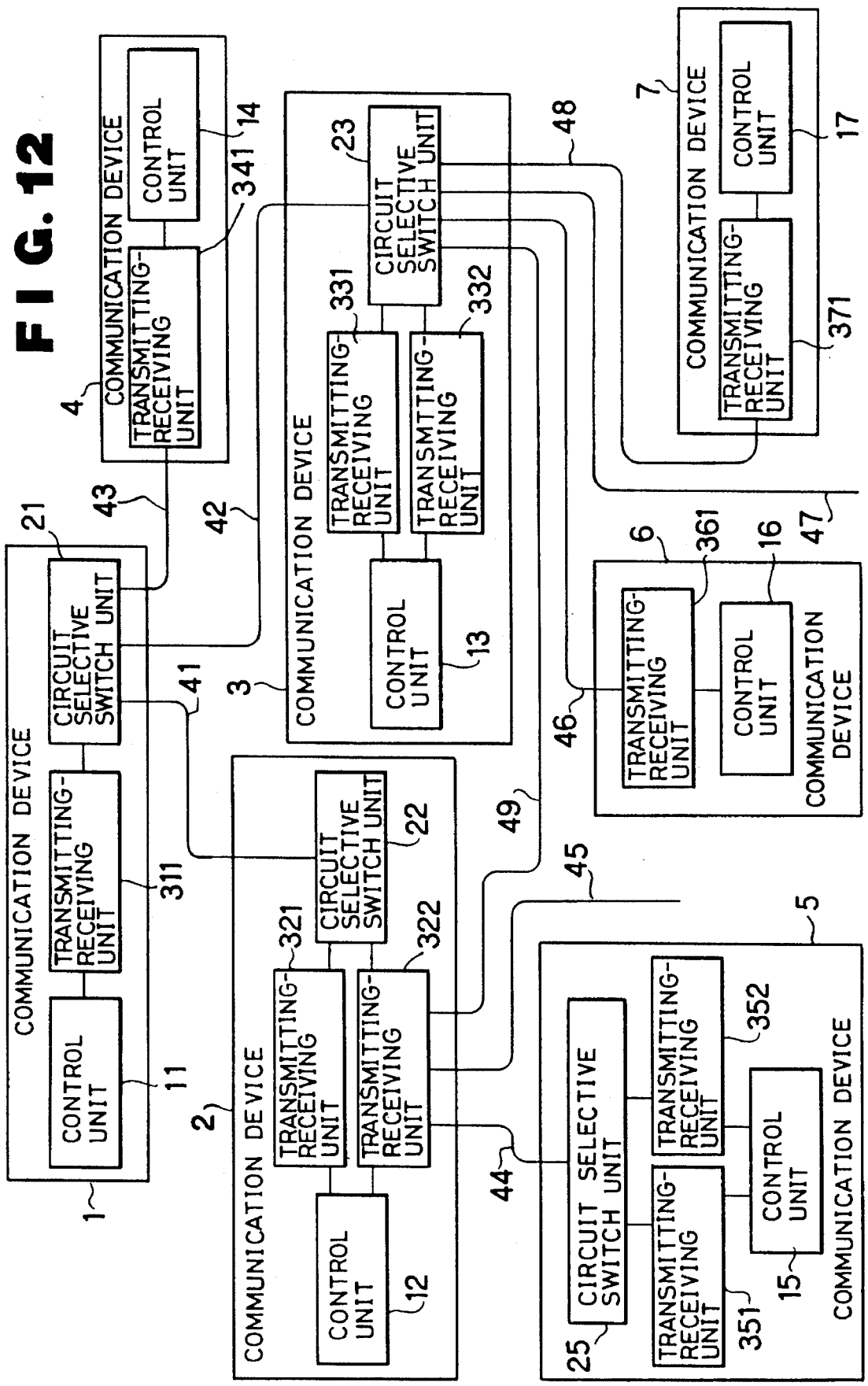

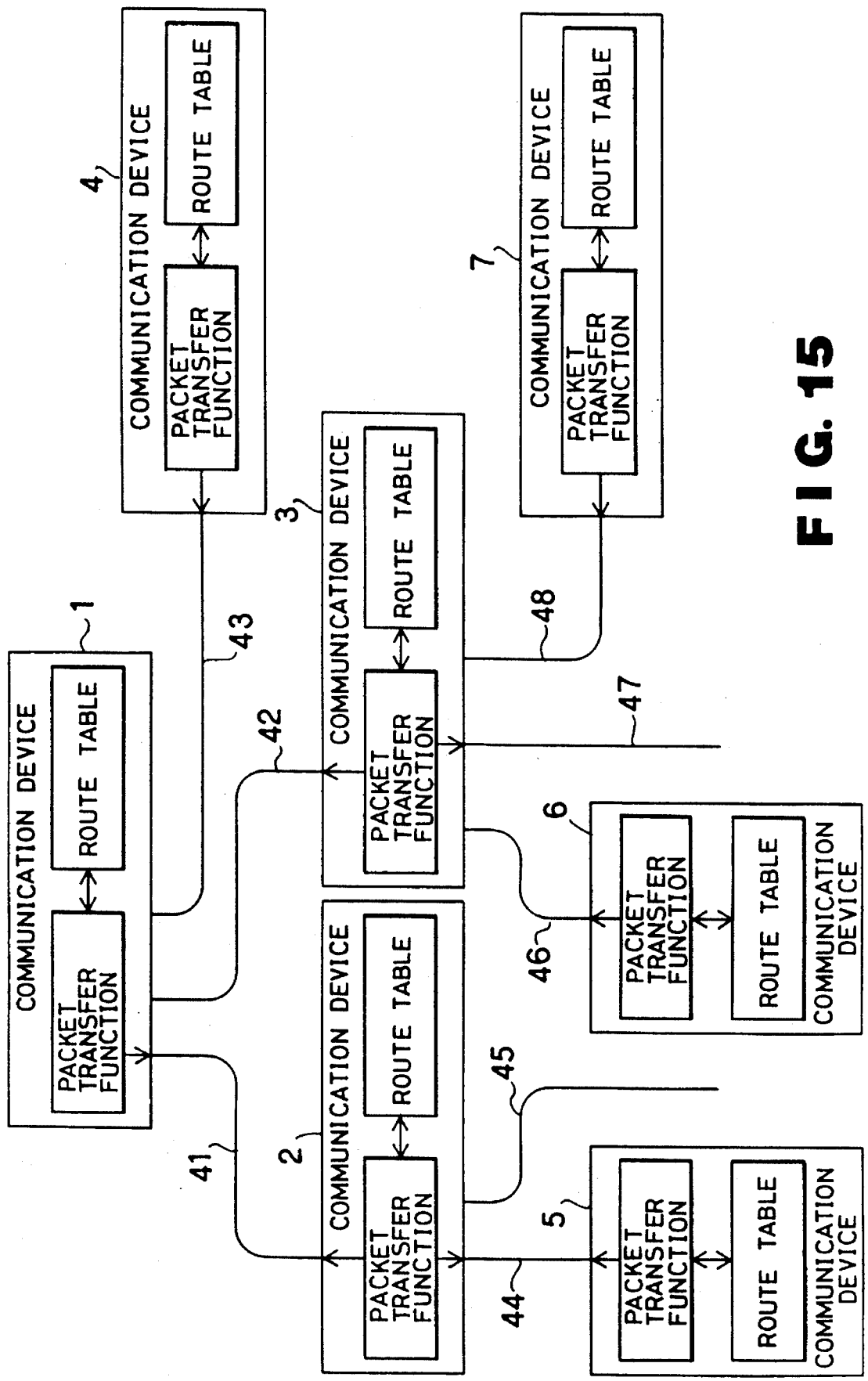
F I G. 15

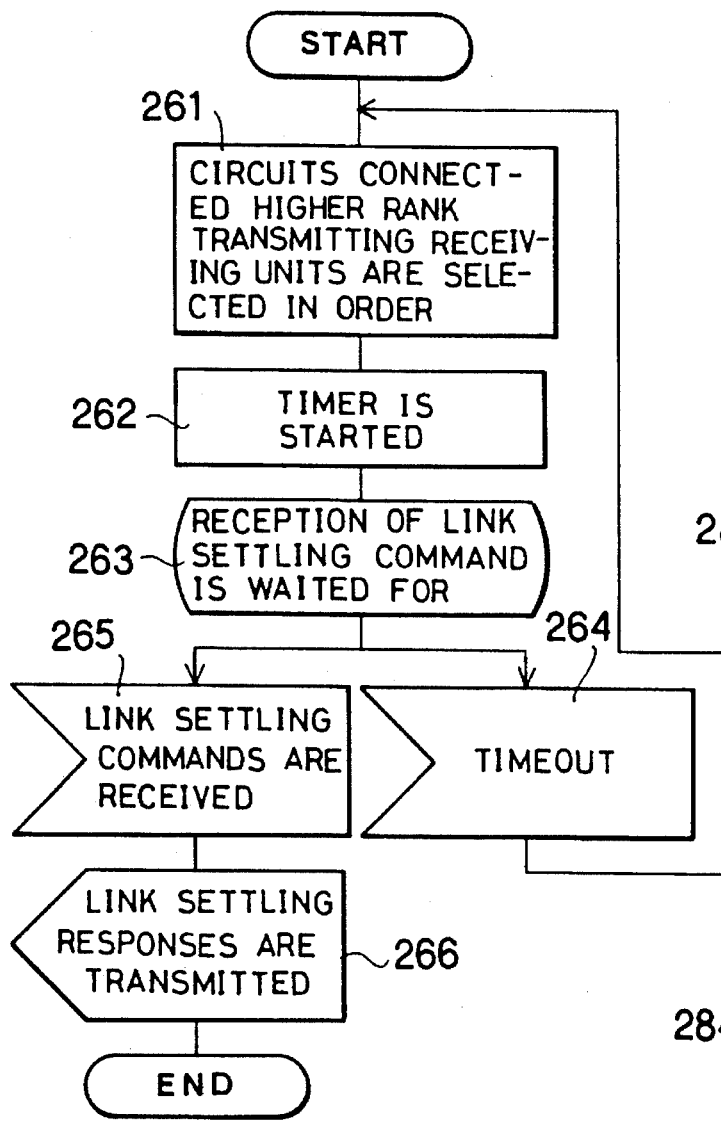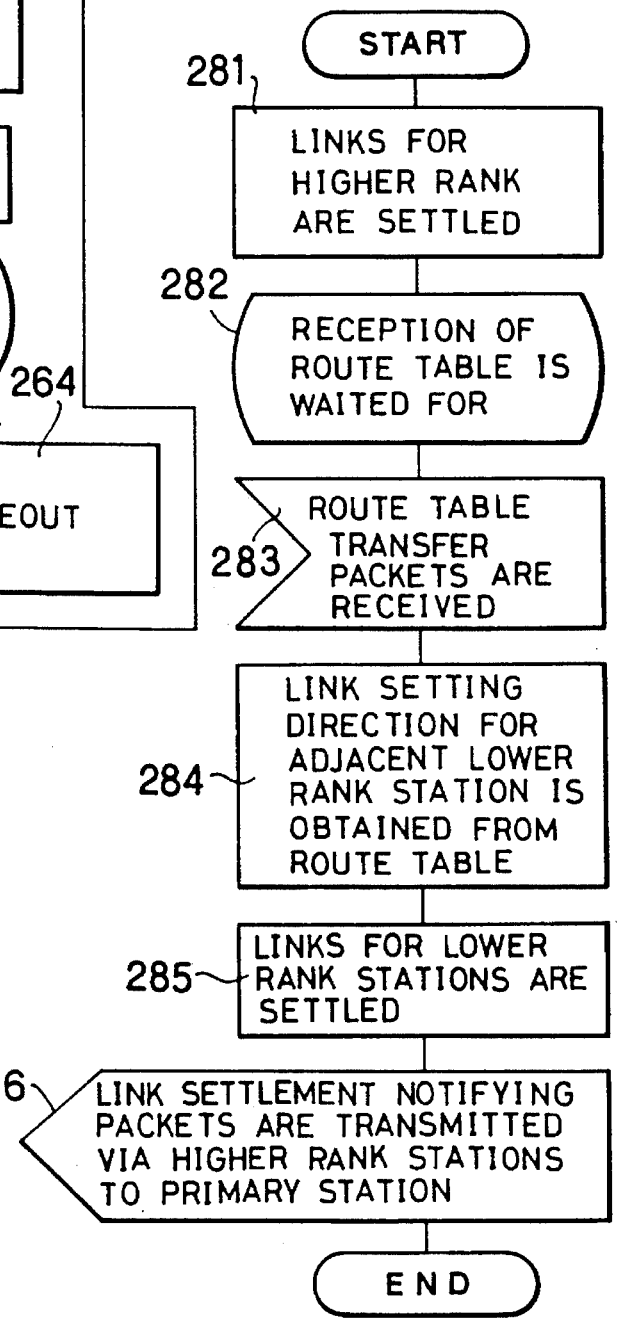

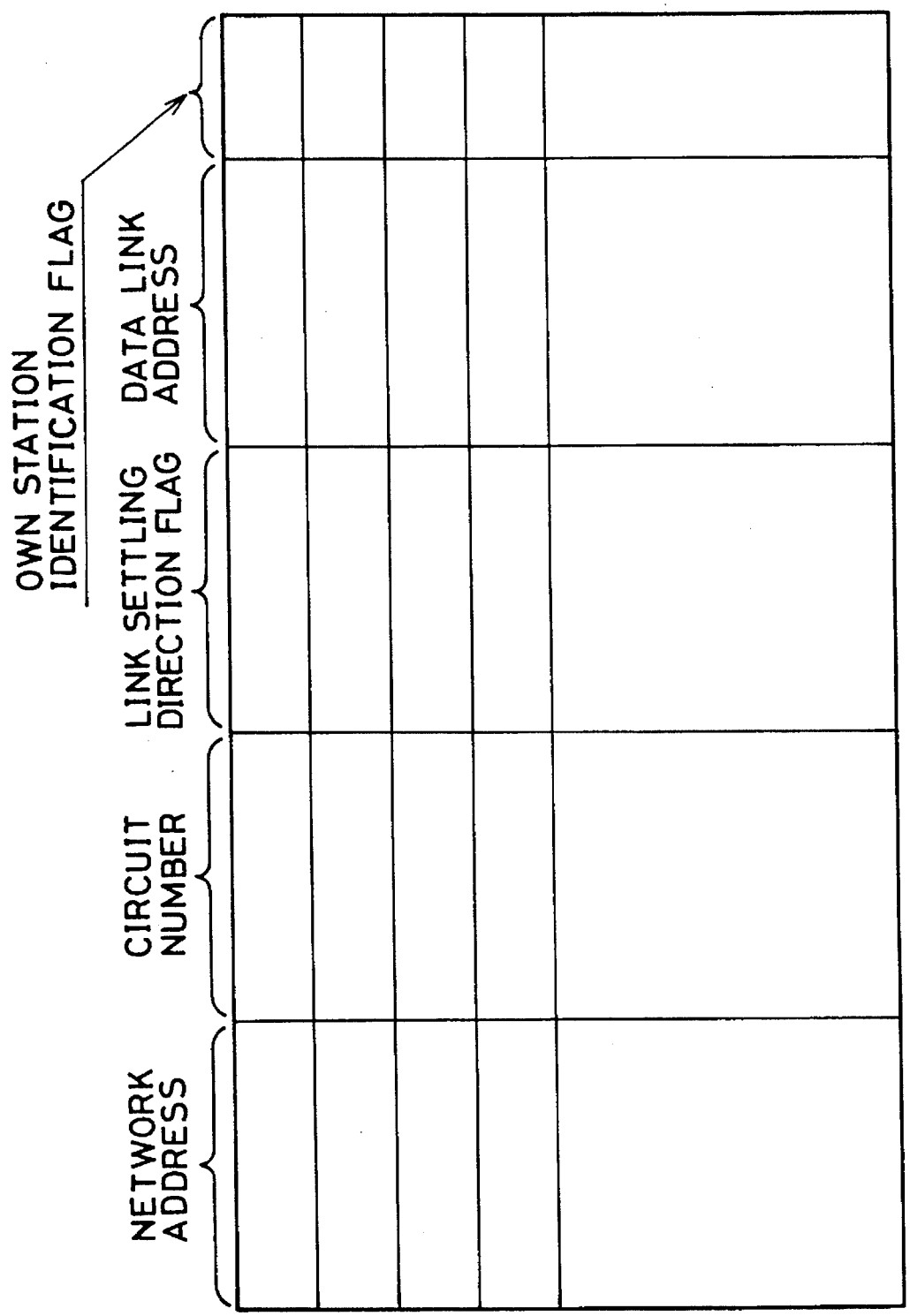

SELECTIVE COMMUNICATION SYSTEM HAVING SEPARATE CONNECTION CIRCUITS BETWEEN COMMUNICATION DEVICES

BACKGROUND OF THE INVENTION

1. Field of the Invention

The present invention relates to communication devices which carry out communication by connecting communication circuits in a mesh form.

2. Description of the Prior Art

FIG. 1 is a simplified diagram of a communication system in which conventional communication devices are connected. In the diagram, reference numerals 1 through 7 are communication devices, 41 through 48 are circuits which connect communication devices of this kind with each other and with communication devices not shown, 11 through 17 are control units which control transmission and reception of the communication devices 1 through 7 respectively, and 311 through 371 denote one transmitting-receiving unit or a plurality of transmitting-receiving units provided in the communication devices 1 through 7 respectively.

Next, the operation of the conventional communication devices will be described. The respective control units 11 through 17 drive the transmitting-receiving units 311 through 371 and settle set communication links with control units of the adjacent communication devices 1 through 7 connected via the circuits 41 through 48. This means, for example, that when the communication device 1 communicates with the communication device 2, the control unit 11 of the communication device 1 and the control unit 12 of the communication device 2 drive the transmitting-receiving unit 311 and the transmitting-receiving unit 323 respectively to settle set a link via the circuit 41. The same processes are performed among the adjacent other communication devices 1 through 7.

On the other hand, it is possible to communicate via circuits even between communication devices not directly connected with each other, that is, like for example, between the communication device 1 and the communication device 5. In this case, after the settlement of the link, if a packet, that is, a unit in which data is transmitted via circuits is additionally provided with a network address for identifying a destination communication device, the communication device which has received the packet decides whether the packet is directed to itself or to one of the other stations in accordance with a destination network address in the packet, and at the same time, carries out routing processing which decides if the packet is directed to the other stations, to which circuit it should be transferred. In order that the communication devices 1 through 7 each may execute the routing processing, they store a route table for guiding a packet to adjacent communication devices (or its own station) from the destination network address.

In the above-mentioned conventional device, there was a problem that because the transmitting-receiving units 311 through 371 for each circuit are needed, control algorithms by which the control units 11 through 17 of the communication devices 1 through 7 control the respective transmitting-receiving units 311 through 371 are complex and moreover, the communication devices 1 through 7 become expensive.

In addition, there was a problem that the communication devices 1 through 7 each store a route table for the routing processing. But, in the case where alterations in the network structure such as additions, removals, and the like of the communication devices occurred, the route table had to be altered for all the communication devices, and in the case where the communication devices were installed in a wide area, trouble in renewal of the route table not only became profound but also it was generally difficult to make-up the route table without contradiction.

SUMMARY OF THE INVENTION

The present invention is devised in order to solve such a problem as described above, and the object thereof is to obtain communication devices which allow communication links among a plurality of communication devices to be easily settled while the increase of an amount of hardware of the communication devices is suppressed, and at the same time, allow the make-up of a route table and the communication to be easily carried out.

A communication device related to the present invention is provided therein with one transmitting-receiving unit, a circuit selective switch unit for selecting an arbitrary circuit or a plurality of circuits among a plurality of circuits and connecting it or them to the transmitting-receiving unit, and a control unit for controlling the transmitting-receiving unit and the circuit selective switch unit and carrying out the communication procedure.

Also, in the case where a communication system provided logically with a tree-like circuit network is constructed with one of a plurality of communication devices used as the highest rank station and the others used as lower rank stations, each communication device is provided with higher rank transmitting-receiving units and/or lower rank transmitting-receiving units for communicating with communication devices positioned at higher and/or lower rank positions of their own station, a circuit selective switch unit for selecting one of the circuits and connecting it to these transmitting-receiving units, a control unit having a function of controlling the transmitting-receiving units and the circuit selective switch unit and a function of transferring the route tables to communication devices positioned at lower rank positions, thereby settling circuit links in order from a primary station toward lower rank stations, and at the same time, transferring route tables to communication devices of which circuit links have been settled.

In the communication device according to the present invention, the circuit selective switch unit is controlled by the control unit and the communication procedure is carried out while an arbitrary circuit or a plurality of circuits among a plurality of circuits are selected, allowing one transmitting-receiving unit or a set of a higher rank transmitting-receiving unit and a lower rank transmitting-receiving unit to communicate with a plurality of communication devices.

In the case where a communication network has a tree-like hierarchical structure, since the structure of a route table is simplified, and at the same time, a routing information table is transferred in order from a primary station in accordance with a hierarchical structure of a communication network, the route table can be intensively managed at the primary station and renewal of the route table is easy.

BRIEF DESCRIPTION OF THE DRAWINGS

FIG. 12 is a block diagram showing a communication device of another embodiment according to the present invention;

FIG. 15 is a lay-out diagram of a routing processing means of a communication device of the same embodiment;

FIGS. 17 through FIG. 19 and FIGS. 21 through FIG. 23 are flowcharts explanatory of operations of the same embodiment; and FIG. 20 is a format diagram of a route table explanatory of operations of the same embodiment.

DETAILED DESCRIPTION OF THE PREFERRED EMBODIMENT

Figure 2:
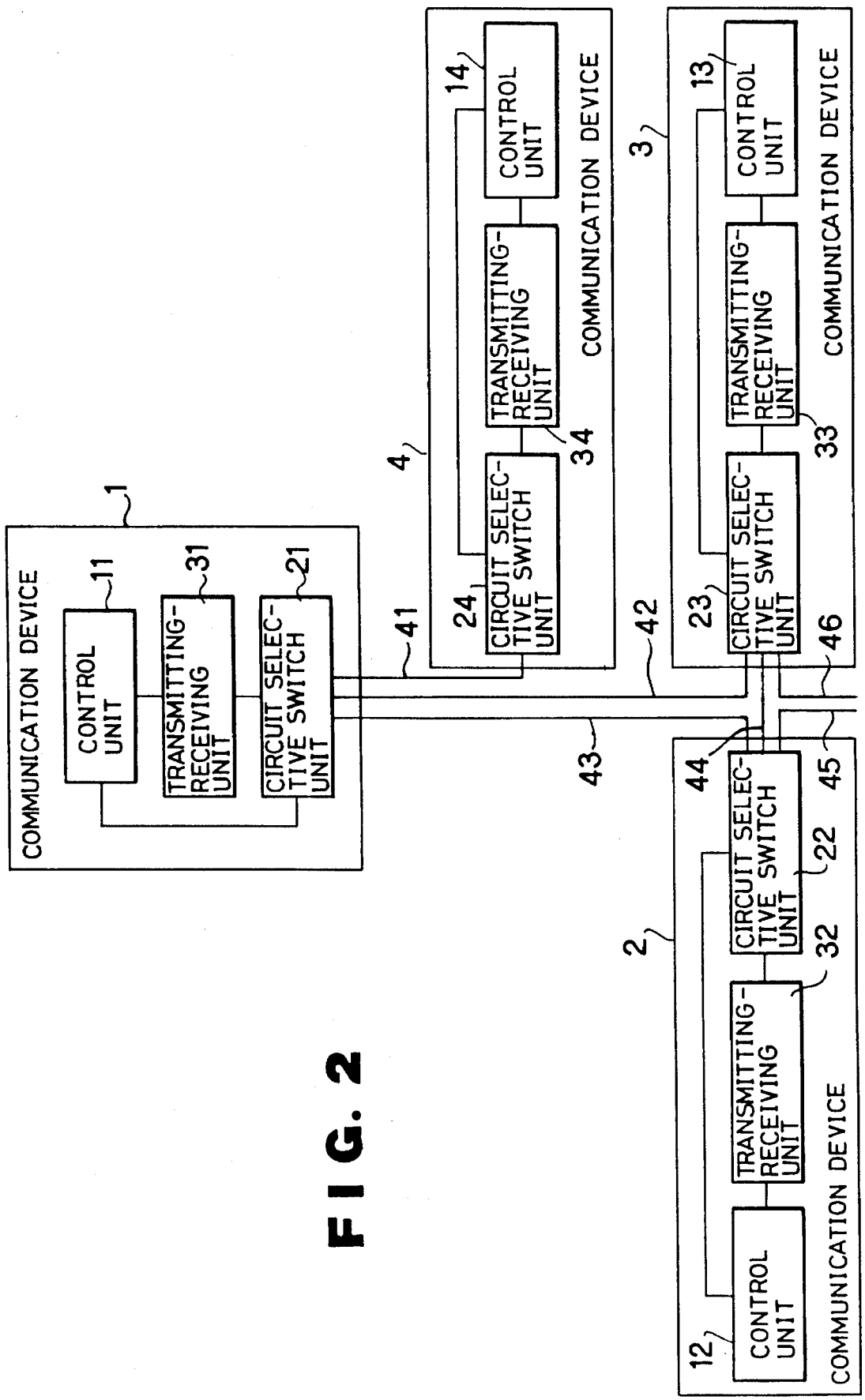
FIG. 2 is a block diagram showing a communication device according to an embodiment of the present invention.

FIG. 2 is a block diagram showing a communication device as one embodiment according to the present invention. In FIG. 2, reference numerals 1 through 4 are communication devices which communicate with each other via circuits 41 through 46, reference numerals 11 through 14 are control units which control circuit selective switch units 21 through 24 and transmitting-receiving units 31 through 34 and carry out a communication procedure, reference numerals 21 through 24 are circuit selective switch units which connect an arbitrary circuit or a plurality of circuits among the plurality of circuits 41 through 46 to the transmitting-receiving units 31 through 34, and the reference numerals 31 through 34 are the transmitting-receiving units which transmit and receive signals.

Figure 3:
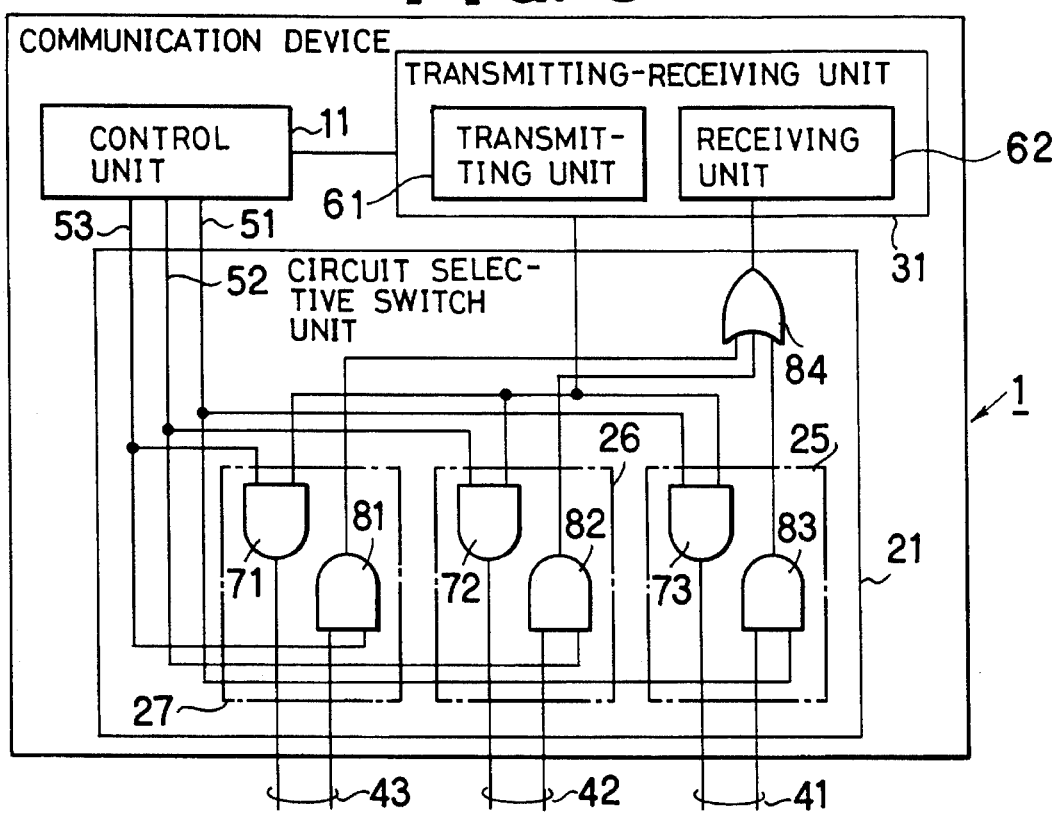
FIG. 3 and FIG. 4 are structural diagrams of concrete circuits of a circuit selective switch unit of the communication device shown in FIG. 2.

FIG. 3 is a structural diagram of a concrete circuit of a circuit selective switch unit in the communication device shown in FIG. 2. FIG. 3 shows a concrete circuit of the circuit selective switch unit 21 of the communication device 1. In FIG. 3, reference numerals 25 through 27 are circuit selective switches which connect the circuits 41 through 43 to the transmitting-receiving unit 31, reference numerals 51 through 53 are circuit selective signal lines which transmit a control signal for connecting an arbitrary circuit or a plurality of the circuits among a plurality of circuits 41 through 43 to the transmitting-receiving unit 31, reference numerals 61 and 62 are a transmitting unit and a receiving unit, respectively, in the transmitting-receiving unit 31, reference numerals 71 through 73 are AND gates on the transmitting side for transmitting a transmitting signal from the transmitting unit 61 to the circuits 41 through 43 by outputting a logical "1" to the circuit selective signal lines 51 through 53 from the control unit 11, reference numerals 81 through 83 are AND gates on the receiving side for delivering receiving signals in the circuits 41 through 43 to the receiving unit 62 by outputting a logical "1" on the circuit selective signal lines 51 through 53 from the control unit 11, and reference numeral 84 is an OR gate for bringing connected circuits simultaneously into receiving states.

Figure 4:
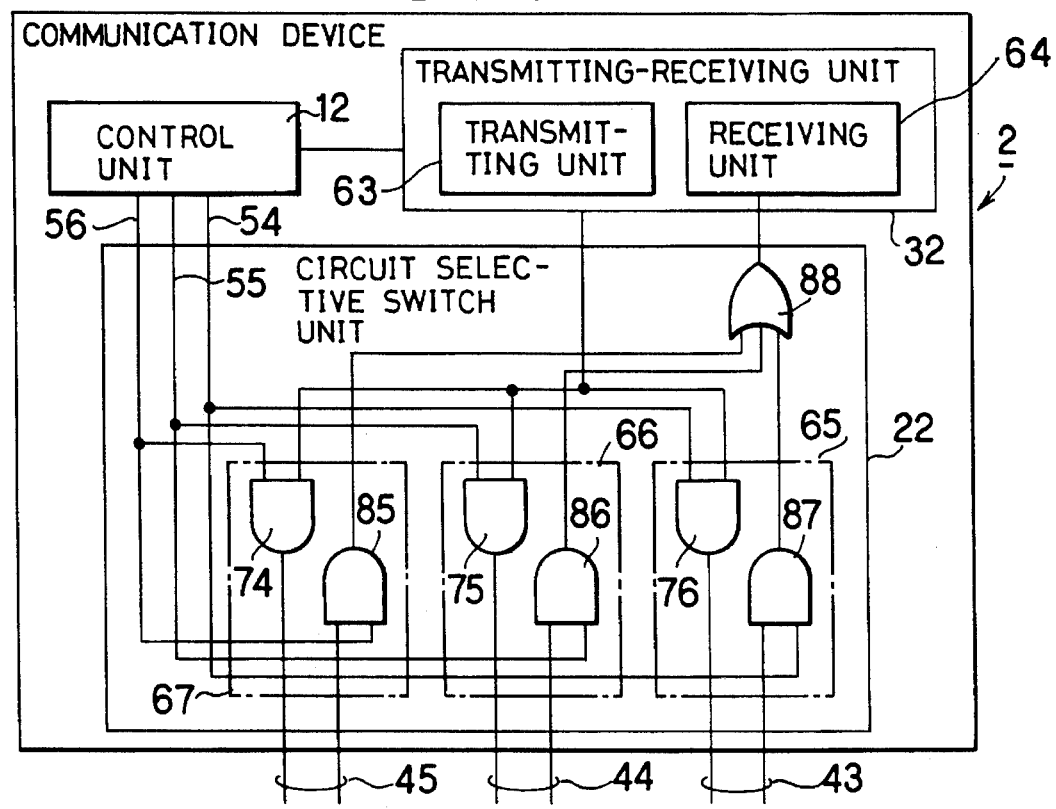

FIG. 4 is a structural diagram of a concrete circuit of a circuit selective switch unit in the communication device shown in FIG. 2. FIG. 4 shows a concrete circuit of the circuit selective switch unit 22 in the communication device 2. The structure is the same as that of the communication device shown in FIG. 2. In FIG. 4, reference numerals 54 through 56 are circuit selective signal lines, reference numerals 63 and 64 are a transmitting unit and a receiving unit, respectively, reference numerals 65 through 67 are circuit selective switches, reference numerals are 74 through 76 are AND gates on the transmitting side, reference numerals 85 through 87 are AND gates on the receiving side, and a reference numeral 88 is an OR gate on the receiving side.

Next, the operation of the communication device, the embodiment according to the present invention, will be described. The control units 11, 12, 13, and 14 shown in FIG. 2 control the circuit selective switch units 21, 22, 23, and 24 and carry out transmission and reception of a command/response by selecting an arbitrary circuit or a plurality of circuits.

Figure 1:
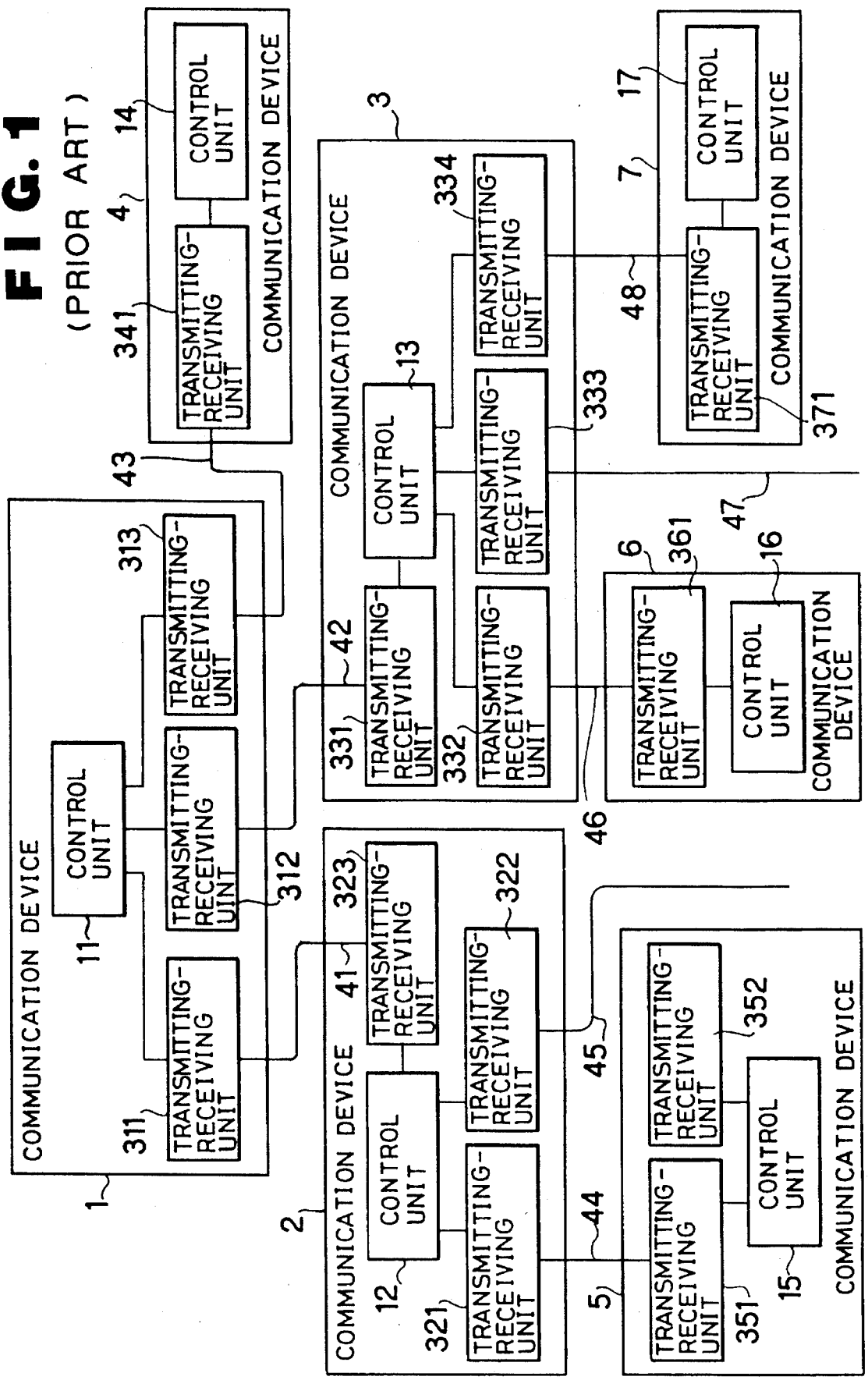
FIG. 1 is a simplified block diagram of a communication system in which conventional communication devices are connected.

In the communication devices according to the present invention, one of the four communication devices 1 through 4 is used as a primary station, and the other stations are used as secondary stations, carrying out communication between the primary station and the secondary stations. In FIG. 1, the communication device 1 is a primary station, and communication devices 2, 3, and 4 are secondary stations. The fact that a station is a secondary station is set as initial information in the communication devices 2, 3, and 4. Information, on the other stations except the self station is not set. Furthermore, it is known in the communication device 1 that since the self station is a primary station, the other stations are all secondary stations. Then, a primary station transmits a circuit specifying command to each of the secondary stations, each of the secondary stations returns a circuit specifying response, the primary station transmits a command for settling a link for each of the secondary stations, and each of the secondary stations returns a response for settling the link, thereby setting up a communication link between the primary station and each of the secondary stations. Each of the secondary stations can not carry out communication before the communication link is set up. After the settlement of the link, the primary station polls each of the secondary stations at least once within a given time, and each of the secondary stations returns a response for the polling.

For example, there is below considered a case where the communication device 1, a primary station, communicates with the communication devices 2 and 4. In FIG. 3, the control unit 11 in the communication device 1 selects the circuits 41 and 43 by outputting a logical "1" on the circuit selective signal lines 51 and 53. Next, the transmitting unit 61 transmits a circuit specifying command to the selected circuits 41 and 43, and when a response to the command is returned to the device 1, the device 1 carries out a link settling procedure. After the settlement of the link, the communication device 1 also continues to select the same circuits 41 and 43 as before the settlement of the link and carries out polling.

On the other hand, in FIG. 2, the communication device 2, a secondary stations does not know to which circuit a communication device acting as a primary station is connected before the settlement of a link. In FIG. 4, therefore, the control unit 12 connects all of the circuits 43, 44, and 45 to the transmitting-receiving unit 32 by outputting a logical "1" on the circuit selective signal lines 54, 55, and 56. Then, when a circuit specifying command is received, the control unit 12 outputs a logical "1" on the circuit selective signal line 54 and a logical "0" on the circuit selective signal lines 55 and 56 in order to enable the circuit selective switch 65 in accordance with the circuit selective switch number corresponding to the circuit to be connected in the secondary station carried on the circuit specifying command, thereby connecting only the circuit 43 to the transmitting-receiving unit 32, returning the response for the circuit specifying command carrying, carrying out the link settling procedure. Once the link is settled, the control unit 12 carries out communication via the circuit 43 through which the link settlement procedure has been carried out. The communication device 4 operates in the same way as the communication device 2. But, since the communication device 4 is connected, as shown in FIG. 2, only to the circuit 41, the control unit 14 keeps the circuit 41 selected irrespective of whether the settlement of the link has occurred.

Figure 5:
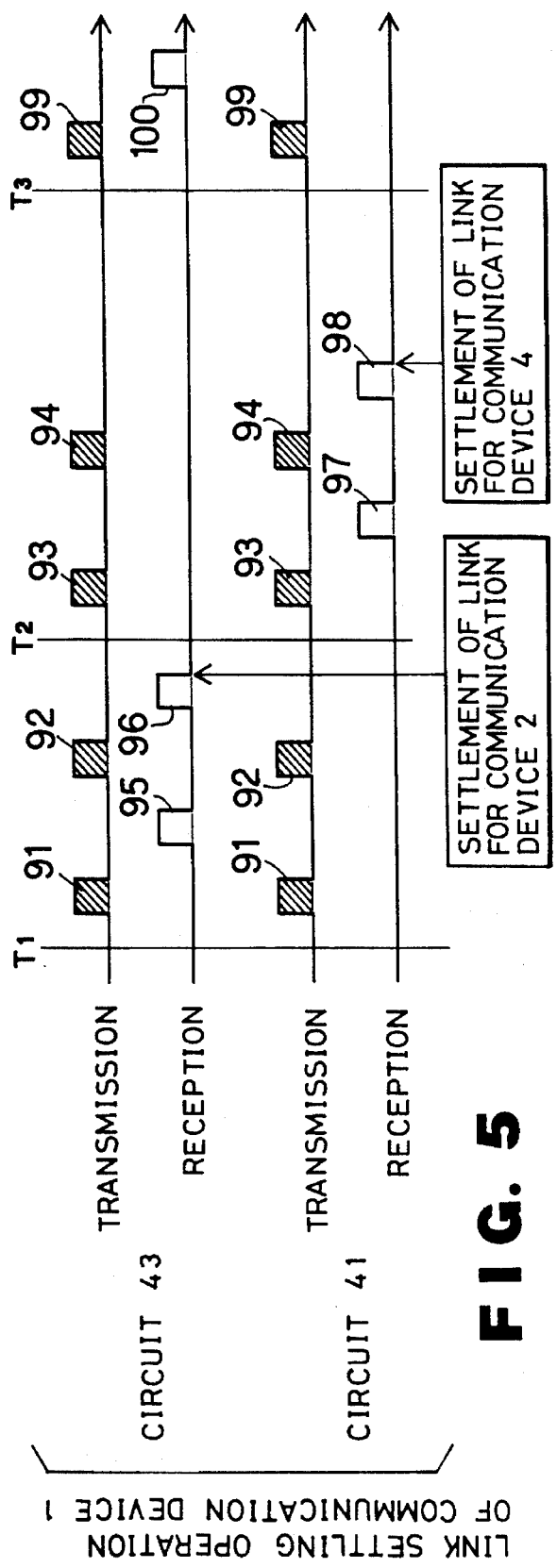
FIG. 5 is a timing chart showing a link settling operation of the communication device set up as a primary station among communication devices shown in FIG. 2.

FIG. 5 is a timing chart showing a link settling operation of the communication device set up as a primary station in the communication devices shown in FIG. 2. FIG. 5 is a timing chart showing an example of the operation of the communication device 1. In FIG. 5, $T_1$, $T_2$, and $T_3$ are points in times, reference numeral 91 is a circuit specifying command which selects the circuit 43 directed to the communication device 2, 92 is a link settling command directed to the communication device 2, 93 is a circuit specifying command which selects the circuit 41 directed to the communication device 4, 94 is a link settling command addressed to the communication device 4, 95 is a response for the circuit specifying command 91, 96 is a response for the link settling command 92, 97 is a response for the circuit specifying command 93, 98 is a response for the link settling command 94, 99 is a command for the communication device 2 after the settlement of the link, and 100 is a response for the command 99.

The communication device 1 set up as a primary station starts a circuit selective operation from the time $T_1$. The operation of the communication device 1 after the time $T_1$, is as follows.

[1] At the time $T_1$, the communication device 1 selects the circuits 43 and 41 and transmits the circuit specifying command 91 affixed with an address directed to the communication device 2. The communication devices 2 and 4 receive the circuit specifying command 91. But, only the communication device 2 judges the command 91 to be directed to its own station, selects the circuit 43, and returns the response 95. When the communication device 1 receives the response 95, it transmits the link settling command 92 to the circuits 43 and 41. In the same way as described above, only the communication device 2 judges the command 92 to be directed to its own station and returns the response 96 to the circuit 43 which has been already selected. The communication devices 1 and 2 settle the link by the above procedure.

[2] At the time $T_2$, the communication device 1 continues to select the circuits 43 and 41 and transmits the circuit specifying command 93 affixed with an address directed to the communication device 4. The communication devices 2 and 4 both receive the above-mentioned circuit specifying command 93. But, only the communication device 4 judges the command 93 to be directed to its own station and returns the response 97 to the circuit 41. But, since the communication device 4 has only one connecting circuit and the circuit 41 is fixedly connected, no selecting operation is needed. When the communication device 1 receives the above-mentioned response 97, it transmits the link settling command 94 to the circuits 43 and 41. In the same way as described above, only the communication device 4 judges the command 94 to be directed to its own station and returns the response 98 to the circuit 41. The communication devices 1 and 4 settle their links in accordance with the above procedure.

As described above, the communication device 1, a primary stations settles the link between it and each of the communication stations 2 and 4, both secondary stations. Communication after the settlement of the links is carried out as described below. When a request to send for the communication device 2 occurs at the time $T_3$, the communication device 1 transmits the command 99 directed to the communication device 2 to the circuits 41 and 43. Since the communication device 2 selects the circuit 43 fixedly and is in a receiving state after the settlement of the link, it can receive the command 99 and returns the response 100 for the command 99.

Figure 6:
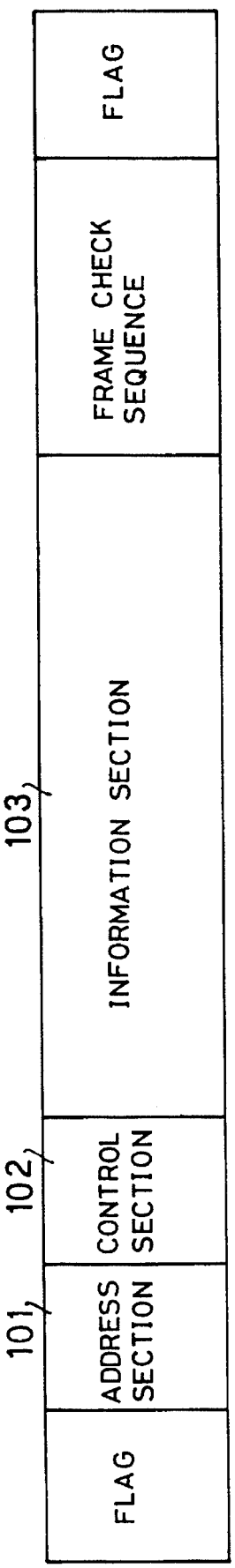
FIG. 6 is a diagram showing a frame format of a transmission frame of HDLC used in the communication device shown in FIG. 2.

FIG. 6 is a diagram showing a frame format of a transmission frame of an HDLC handled in the communication device shown in FIG. 2. FIG. 6 shows a frame format of an HDLC (High-level Data Link Control), one of data transmission control procedures. In FIG. 6, a reference numeral 101 is an address section, 102 is a control section, and 103 is an information section. FCS (Frame Check Sequence) in FIG. 6 is a frame check sequence.

Figure 7:
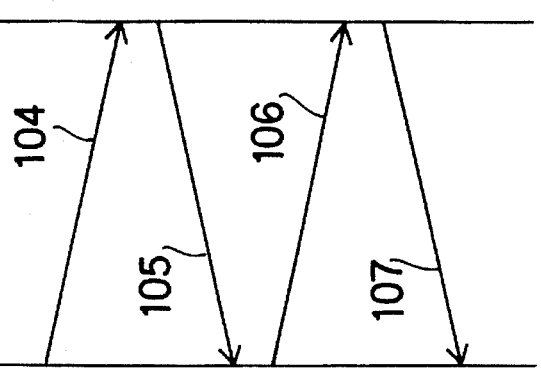
FIG. 7 is a sequence diagram showing command responses of HDLC between a primary station and a secondary station among the communication devices shown in FIG. 2.

FIG. 7 is a sequence diagram showing commands and responses of an HDLC between a primary station and a secondary station among the communication devices shown in FIG. 2. FIG. 7 is a diagram showing a circuit selective procedure and a link settling procedure based on the HDLC. In FIG. 7, a reference numeral 104 is a XID (Exchange Identification) command usable as a circuit specifying command, 105 is a XID response usable as a circuit specifying response, 106 is an SNRM (Set Normal Response Mode) command corresponding to the link settling command, and 107 is a UA (Unnumbered Acknowledgement) command corresponding to the link settling response.

Figure 8:
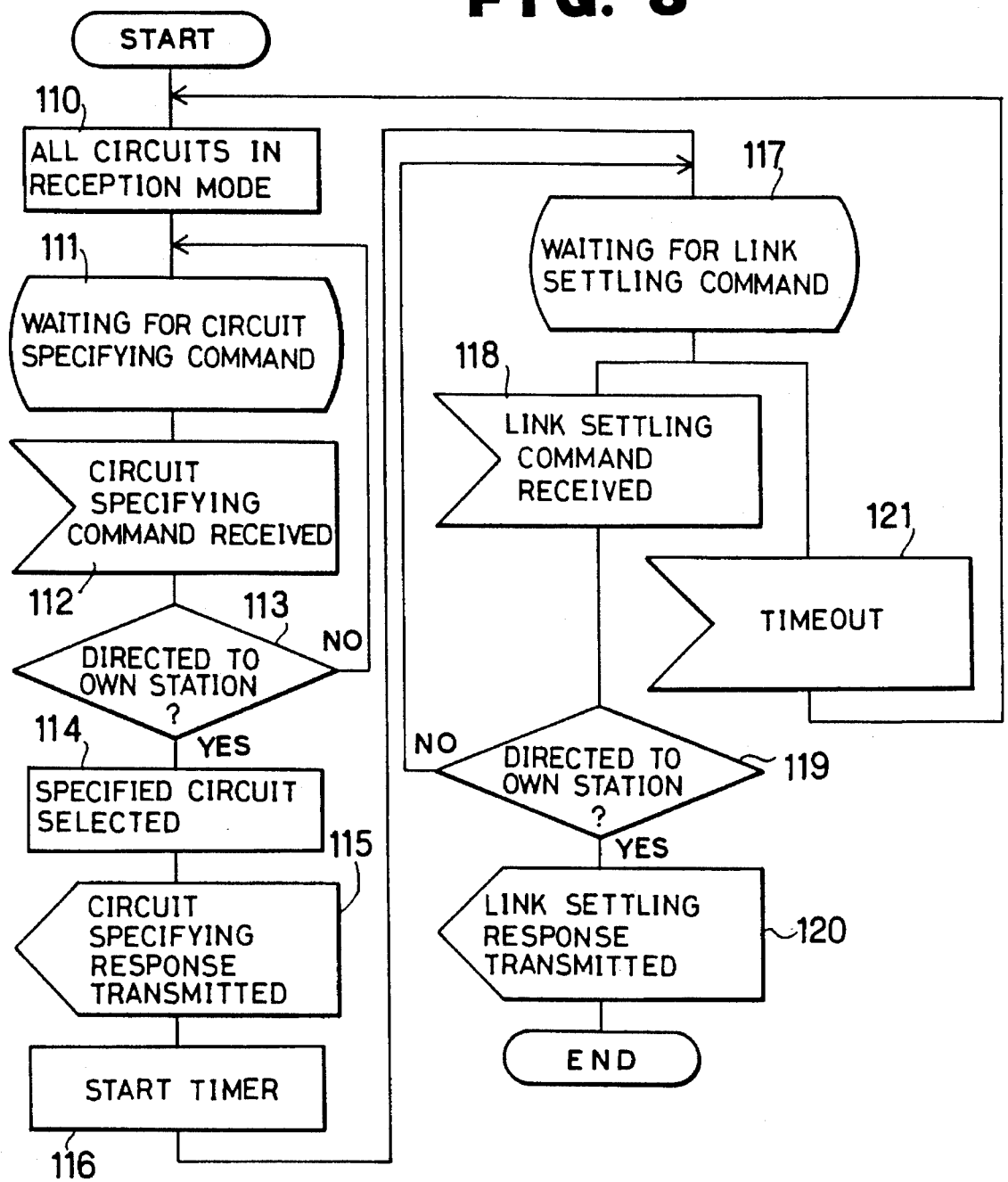
FIG. 8 is a flowchart showing a link settling operation of a communication device set up as a secondary station among the communication devices shown in FIG. 2.

Next, the link settling operation will be described with reference to FIG. 6 and FIG. 7. To the secondary station, the primary station transmits a XID command 104 which, in the information section 103 thereof, carries the circuit selecting switch number corresponding to the circuit to be connected to the secondary station. The secondary station which has received the XID command 104 judges whether the command 104 is directed to its own station or not by the address section 101, and if it is directed to its own station, the secondary station selects the circuit in accordance with the circuit selective switch number carried in the information section 103 and returns a XID response 105. The primary station which receives the XID response 105 transmits an SNRM command 106 to the secondary station having an address shown in the address section 101. The secondary station which receives this SNRM command 106 judges whether the command 106 is directed to its own station or not by the address section 101, and if it is directed to its own station, the secondary station returns the UA response 107. By the above operation, the link is settled between the primary station and the secondary station. It is clear that the above operation can be also realized using a Basic procedure and the like instead of the HDLC procedure. FIG. 8 is flowchart showing a link settling operations of communication devices set up as secondary stations among the communication devices shown in FIG. 2. FIG. 8 is a flowchart of the link settling operations of the communication devices 2, 3, and 4 set up as secondary stations. The operations will be described in accordance with the element numbers of the flowchart.

Step 110: All circuits are brought into a receiving state.

Step 111: The reception of the circuit specifying command is waited for.

Step 112: When the circuit specifying command is received, the step advances to Step 113.

Step 113: Whether the received circuit specifying command is directed to a device's own station or not is checked, and if it is directed to its own station, the step advances to Step 114, and if not so, the step returns to Step 111.

Step 114: Only one circuit is selected in accordance with the circuit selecting switch number carried on the received circuit specifying command.

Step 115: The circuit specifying response is returned.

Step 116: A timer for judging that the link settling command can not be received is started.

Step 117: The reception of the link settling command is waited for.

Step 118: When the link settling command is received, the step advances to Step 119.

Step 119: Whether the received link settling command is directed to a device's own station or not is checked, and if it is directed to own its station, the step advances to Step 120, and if not so, the step returns to Step 117.

Step 120: The link settling response is returned, and the execution of the link settling procedure is completed.

Step 121: In the case where the link settling command has not be received and timeout of the timer has occurred, the step returns to the first step 110.

Figure 9A:
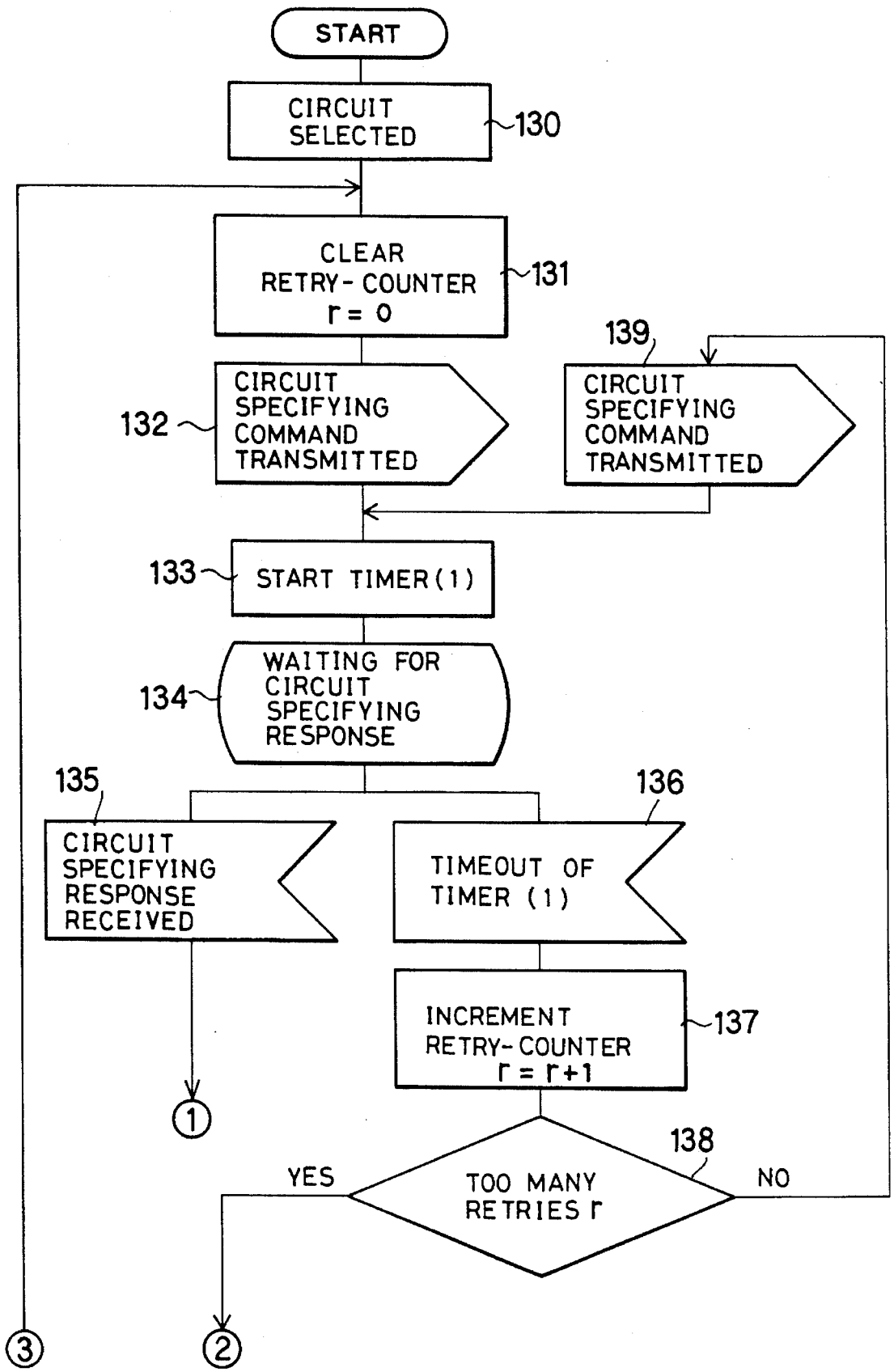
FIGS. 9A and 9B illustrate a flowchart showing a link settling operation of a communication device set up as a primary station among the communication devices shown in FIG. 2.
Figure 9B:
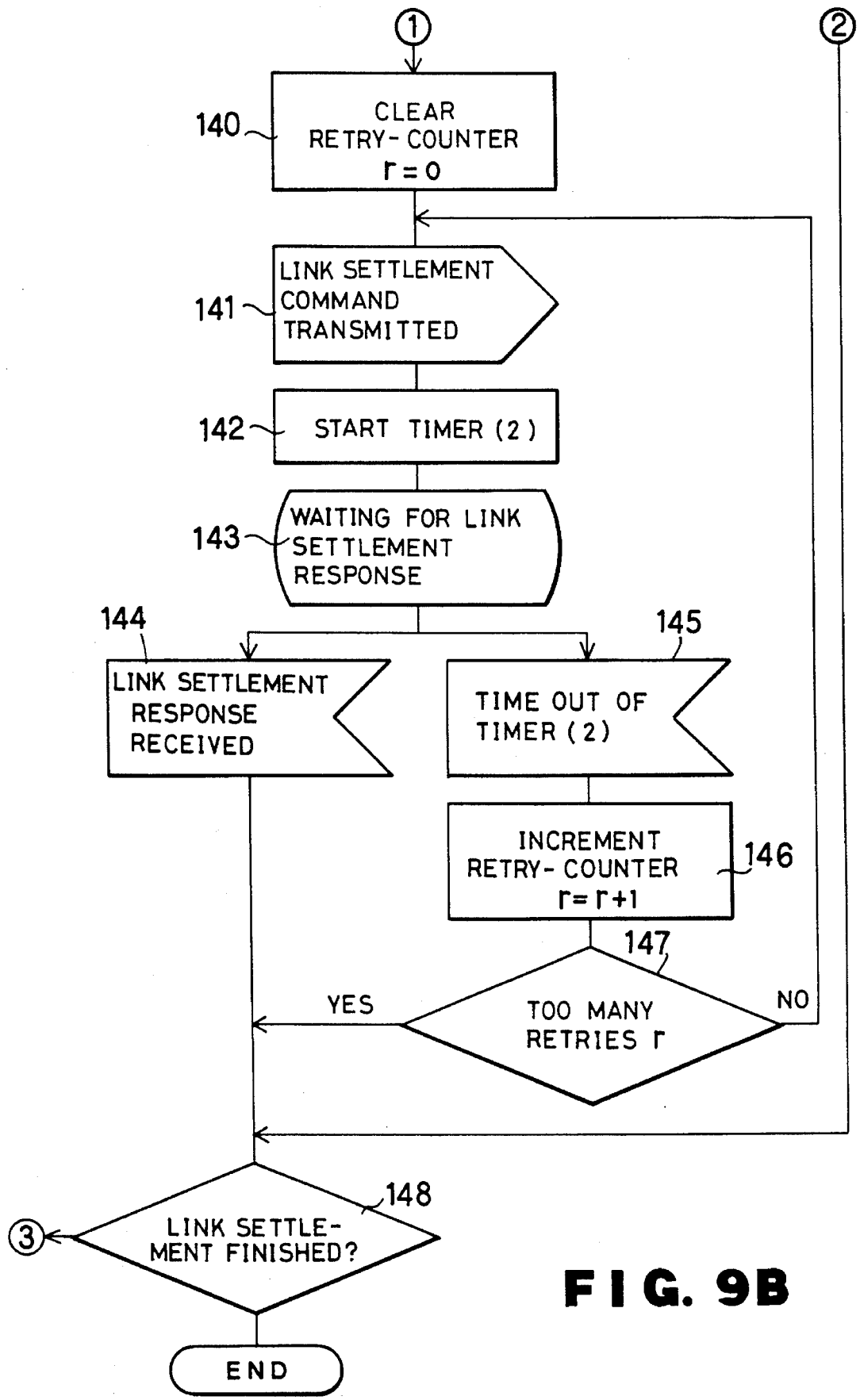

FIGS. 9A and 9B illustrate a flowchart showing a link settling operation of a communication device set up as a primary station among the communication devices shown in FIG. 2. The flowchart of FIGS. 9A and 9B illustrate the link settling operation of the communication device 1 set up as a primary station. Further, the flow chart of FIGS. 9A and 9B illustrate shows an extracted operation for the communication device 1 for which the link has been not settled. Sometimes the extraction is carried out simultaneously with a polling operation (shown in FIG. 11 described later) for the other circuits by which links have been settled.

Step 130: An arbitrary one of a plurality of circuits or a plurality of circuits are selected.

Step 131: The number of times of the transmission retry (retry again) is cleared.

Step 132: Circuit specifying commands addressed to the circuits for which links have not been settled are transmitted.

Step 133: A timer (1) for judging that the circuit specifying response can not be received is started.

Step 134: The reception of the circuit specifying response is waited for.

Step 135: When the circuit specifying response is received in a wait state for the reception of the circuit specifying response in Step 134, the step advances to Step 140.

Step 136: When the circuit specifying response can not be received and timeout of the timer (1) has occurred, the step advances to Step 137.

Step 137: The number of times of the transmission retry is incremented by 1.

Step 138: If the number of times of the transmission retry is not over the prescribed value, the step advances to Step 139 and the retry is repeated. On the other hand, if the number of times of the transmission retry is over the prescribed value, the processing for the concerned circuit is stopped, and the step advances to Step 148. The concerned circuit is regarded to be in a circuit trouble state and made not to be a subject of subsequent link settling operations.

Step 139: The circuit specifying command is again transmitted.

Step 140: The number of times of the transmission retry is again cleared.

Step 141: The link settling command is transmitted.

Step 142: A timer (2) for judging that the link settling response can not be received is started.

Step 143: The reception of the link settling response is waited for.

Step 144: If the link settling response is received in a wait state for the reception of the link settling response, the link for the concerned circuit can be settled. The step advances to Step 148 for detecting whether the settlement of links for the all circuits has been completed or not.

Step 145: When the link settling response can not be received and timeout of the timer (2) has occurred, the step advances to Step 146.

Step 146: The number of times of the transmission retry is incremented by one.

Step 147: If the number of times of the transmission retry is not over the prescribed value, the step returns to Step 141 and the retry is repeated. If the number of times of the transmission retry is over the prescribed value, the processing for the concerned circuit is stopped and the step advances to Step 148. The concerned circuit is regarded to be in a circuit trouble state and made not to be a subject of subsequent link settling operations.

Step 148: The presence or absence of the circuit for which a link has not been settled is checked. If the result leads to the absence, the processing ends. On the other hand, if the result leads to the presence, the step returns to Step 131 to continue the execution of the link settling procedure for the circuit for which the link has not been settled.

Figure 10:
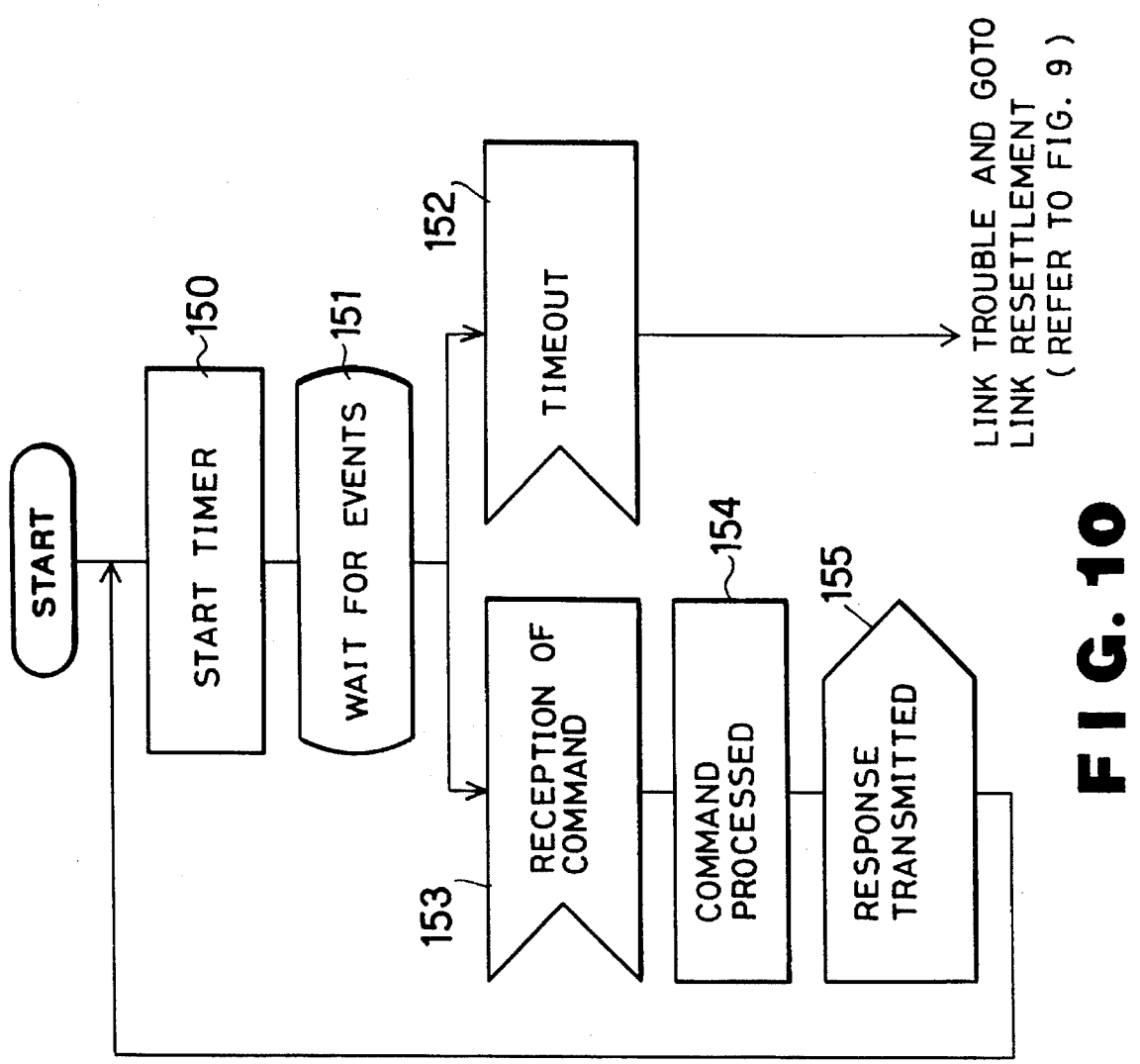
FIG. 10 is a flowchart showing an operation after the settlement of a link of a communication device set up as a secondary station among the communication devices shown in FIG. 2.

FIG. 10 is a flowchart showing an operation after the settlement of a link for a communication device set up as a secondary station among the communication devices shown in FIG. 2. FIG. 10 is a flowchart showing the operations of the communication devices 2, 3, and 4 as secondary stations after the settlement of the links.

Step 150: In the case where circuit troubles in a primary station may be present or the transfer of functions of a primary station accompanied by these troubles is carried out, a timer is started in order to detect a state in which no command has been received.

Step 151: The reception of commands or the event of timeout is waited for.

Step 152: If a timeout occurs during an event wait time, it is regarded to be an occurrence of link troubles, and a link resettling operation is reopened. The settlement of links is carried out for all circuits.

Step 153: When the command is received during an event wait time, the step advances to Step 154.

Step 154: The processing is carried out in accordance with the command.

Step 155: The response is returned. Since the fact that the command has been received, and the response has been returned means that the link is being kept in a normal state, the step advances to Step 150 again, and the next event is waited for after the timer is started again.

Figure 11A:
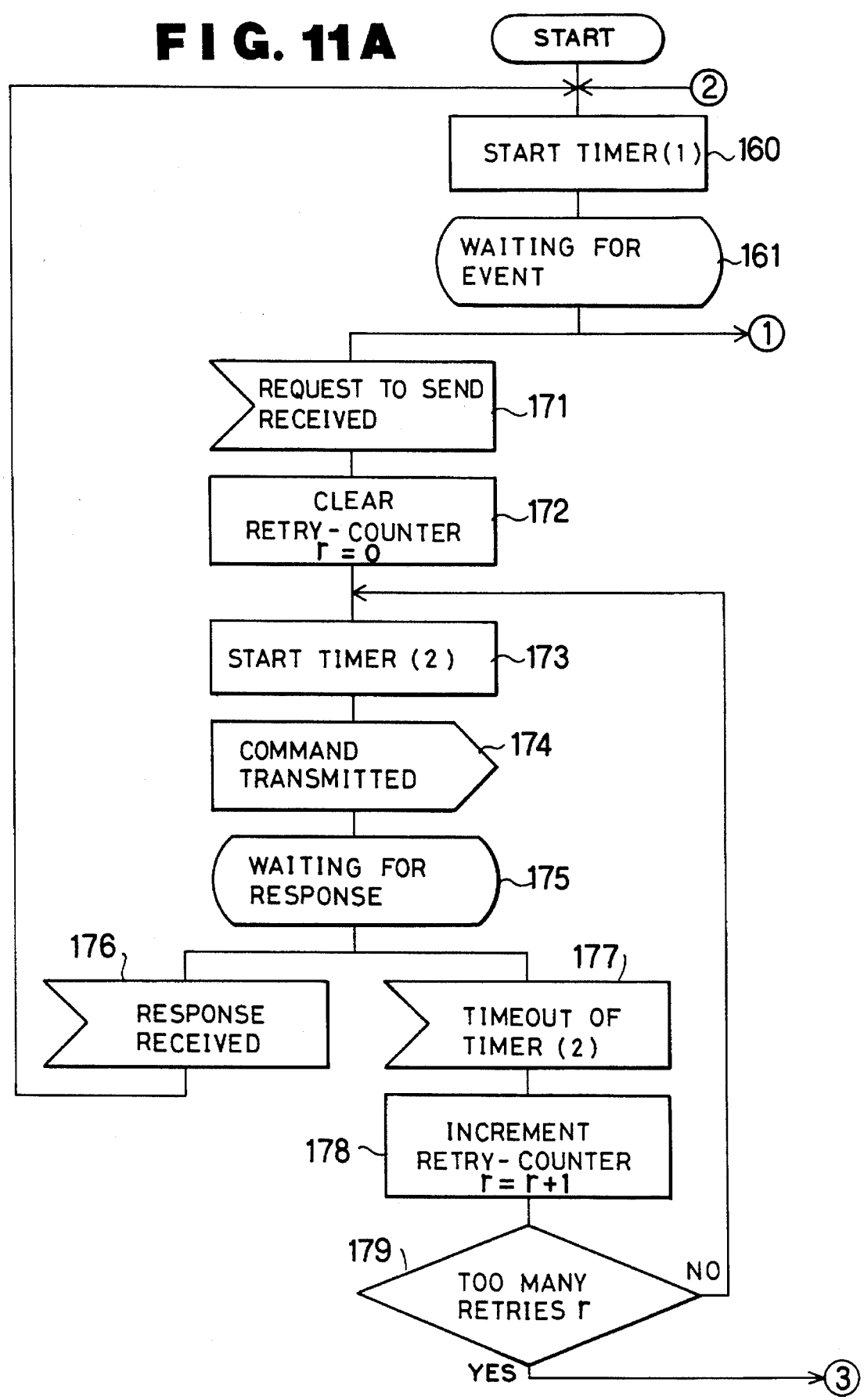
FIGS. 11A and 11B illustrate a flowchart showing an operation after the settlement of a link of a communication device set up as a primary station among the communication devices shown in FIG. 2.
Figure 11B:
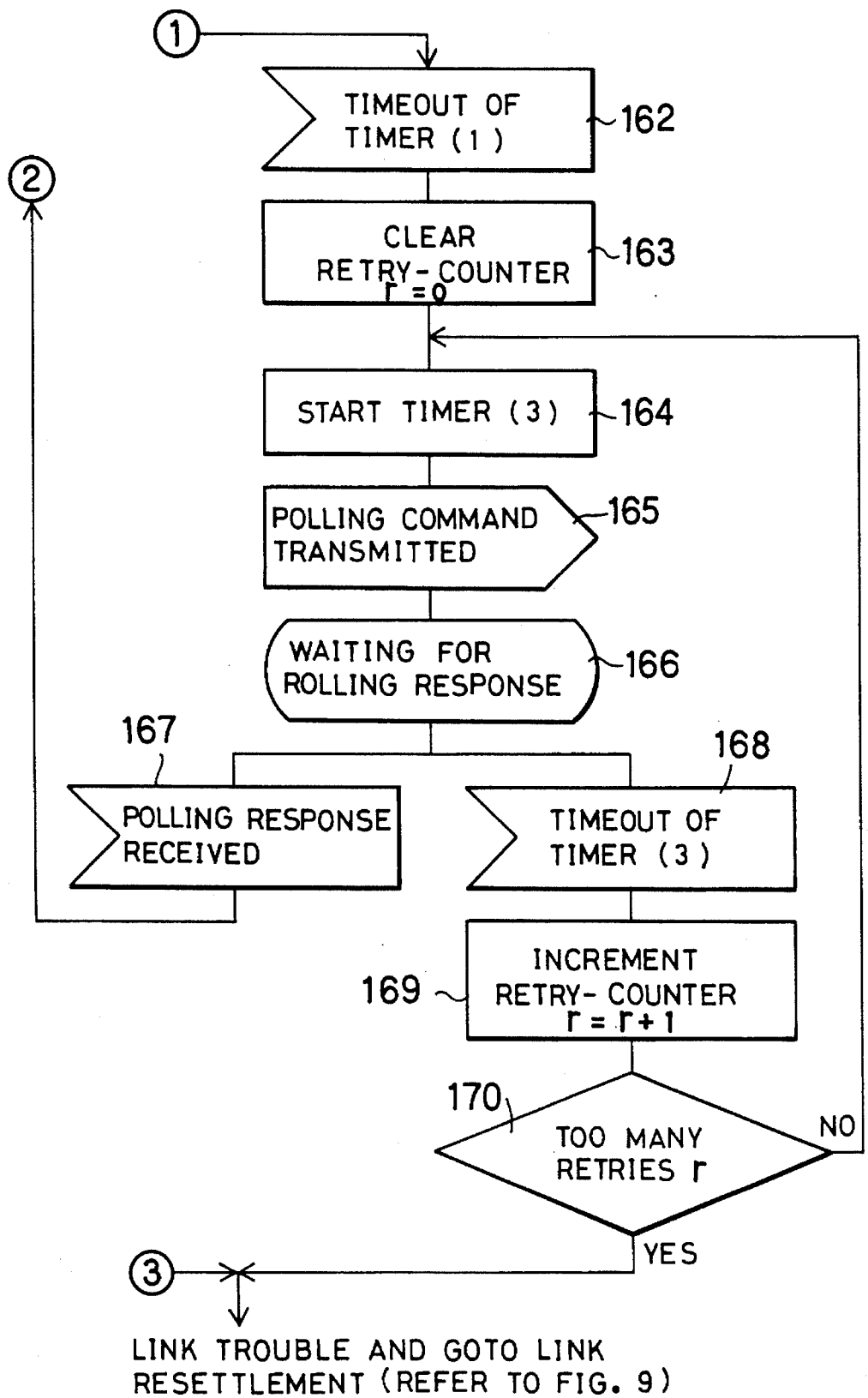

FIGS. 11A and 11B illustrate a flowchart showing an operation after the settlement of the link of the communication device set up as a primary station among the communication stations shown in FIG. 2. FIGS. 11A and 11B illustrate a flowchart showing the operation of the communication device 1, the primary station, for the link after the settlement of the link. In the case where a plurality of settled links are present, the processing shown in FIGS. 11A and 11B illustrate simultaneously and independently carried out for each line.

Step 160: A timer (1) for periodical polling is started.

Step 161: The occurrence of a request to send or timeout is waited for.

Step 162: When timeout of the timer (1) for carrying out polling periodically has occurred, the step is made to advance in order of Step 162, Step 163, Step 164, and Step 165 to transmit a polling command and enter into a receiving operation for the polling response in Step 166.

Step 163: The number of times of the transmission retry for the concerned circuit is cleared.

Step 164: The timer (3) is started in order to detect no reception of the polling response.

Step 165: The polling command is transmitted.

Step 166: The reception of the polling response is waited for.

Step 167: When the polling response is received, the link is confirmed to be normal.

Step 168: If the polling response can not be received and timeout of the timer (3) has occurred, the step advances to Step 169.

Step 169: The number of times of the concerned transmission retry is incremented.

Step 170.: If the number of times of the transmission retry is not over the prescribed value, the step returns to Step 164 and the retry operation continues. On the other hand, if the number of times of the transmission retry is over the prescribed value, it is regarded to be link troubles, and a link resettling operation (Refer to FIGS. 9A and 9B) for the concerned circuit is started.

Step 171: When a request to send occurs in an event wait state in Step 161, the state is transferred to the transmission processing.

Step 172: The number of times of the transmission retry is cleared.

Step 173: The timer (2) for detecting no reception of the response is started.

Step 174: The command is transmitted.

Step 175: The state is brought into a response wait state.

Step 176: When the response is received in a response wait state, after the timer (1) is started in Step 160, the step advances to Step 161 again.

Step 177: When the response can not be received in a response wait state and timeout of the timer (2) has occurred, the step advances to Step 178.

Step 178: The number of times of the transmission retry for the concerned circuit is incremented.

Step 179: If the number of times of the transmission retry is not over the prescribed value, the transmission of the command is retried. On the other hand, if the number of times of the transmission retry is over the prescribed value, it is regarded to be link troubles, and a link resettling operation for the concerned circuit is started.

Next, another embodiment according to the present invention will be described with reference to figure. In FIG. 12, reference numerals 1 through 7 are communication devices, 41 through 49 are circuits to which these communication devices are connected, and 11 through 17 are control units which control circuit selective switch units 21 through 25 and transmitting-receiving units 311 through 371 and carry out communication procedures. Among them, the circuit selective switch units 21 through 25 connect circuits selected from among a plurality of circuits 41 through 49 to the transmitting-receiving units 311 through 371. The transmitting-receiving units 311, 322, 332, and 352 denote lower rank transmitter-receiver units, and the transmitting-receiving units 321, 331, 341, 351, 361, and 371 denote upper rank transmitting-receiving units.

Figure 13:
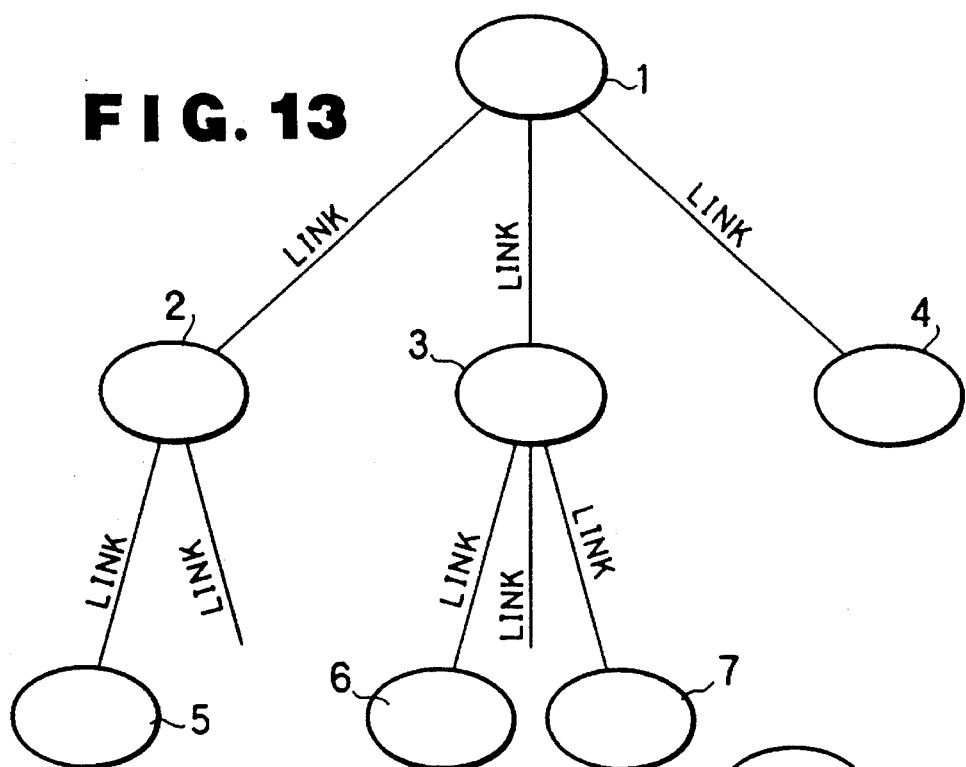
FIG. 13 is a diagram showing a logical structure of a communication system in which communication devices of the same embodiment are connected.

FIG. 13 is a diagram showing a logical tree-like hierarchical structure of the communication system shown in FIG. 12, in which the communication device 1 corresponding to the root of the tree is used a primary station, the other communication devices 2 through 7 are used as secondary stations, and links are spread corresponding to physical circuits 41 through 48 between communication devices. Further, among the secondary stations shown in FIG. 13, secondary stations which spread links directly with the primary station are called first class secondary stations, and those which are in a lower rank than i-th class secondary stations and spread links directly with them are called (i+1)th class secondary stations. (i is a positive integer).

In this case, links are not spread on the circuits which are not needed for constructing a tree-like hierarchical structure among circuits which are physically present. For example, the link corresponding to the circuit 49 in FIG. 12 is not employed in FIG. 13. Such a circuit structure is seen in the case where a redundant structure for improvement in reliability is adopted. In the case where breakdown troubles occur in the circuit 41, a tree-like structure shown in FIG. 14 is used as a substitute, bringing a merit that the communication system can be restored.

Figure 14:
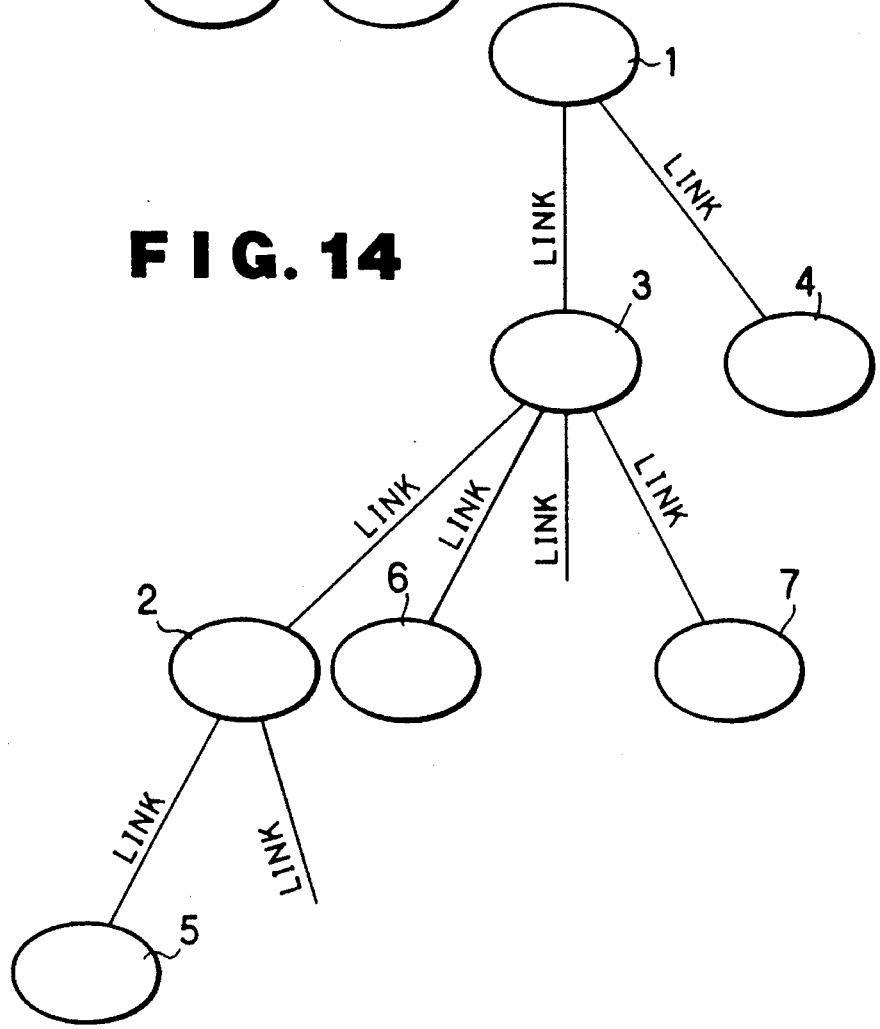
FIG. 14 is a diagram showing still another logical structure of a communication system in which communication devices of the same embodiment are connected.

FIG. 15 is a diagram showing a layout of processing means for routing of a packet, a unit of data transfer, in the communication systems shown in FIG. 12 through FIG. 14. In FIG. 15, a packet transfer function and a route table are placed in the communication devices 1 through 7. Here, when a packet is received, the packet transfer function refers to the destination network address and the route table in the packet and judges whether the concerned packet is directed to a device's own station or to the other stations. If it is addressed to other stations, it is decided to which of the circuits 41 through 48 or the adjacent communication devices 1 through 7 connected via the above circuits the concerned packet should be transferred. Furthermore, the packet transfer function transfers the packet to the decided circuit or the decided adjacent communication device.

Figure 16:
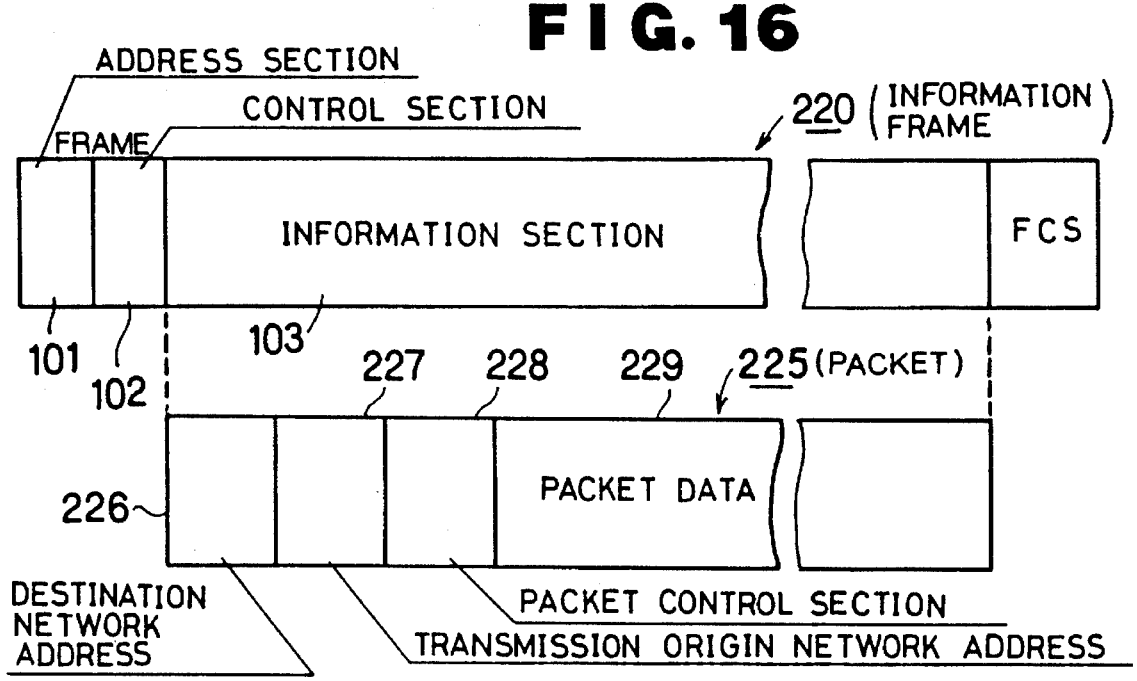
FIG. 16 illustrates format diagrams of a frame and a packet explanatory of an operation of the same embodiment.

FIG. 16 is a diagram showing one example of a frame 220 and a packet 225 which are transferred via the circuit links among the communication devices 1 through 7. The frame 220 shown here is a unit of information when the information is transferred via circuits among adjacent communication devices. The packet 225 shown in FIG. 16 is a unit of data when the data are transferred among communication devices which are not necessarily adjacent, and the packet 225 consists of a destination network address 226 for specifying the destination communication device exclusively among the communication network, a transmission origin network address 227 for specifying the communication device which firstly has sent a packet to a communication network, a packet control section 228 in which the classification of a packet and moreover, necessary information on transfer and control of the packet is set up, and packet data 229 in which data carried by a packet are set up.

Next, the operation of the present embodiment will be described. But, in order to easily understand the operation here, the description will be given in accordance with the order of a, b, and c. a: a link settling procedure for settling links among adjacent communication devices in a tree-like structured hierarchy of a communication network, b: a procedure for transferring a route table used in processing of routing from a primary station to a secondary station after the settlement of links and a procedure for processing of routing, and c: a link settling procedure and a route table transferring procedure will be described in order of a restarting link monitoring procedure when links to adjacent communication devices are monitored and breakdown of the links is detected after the settlement of the links and transfer of a route table are completed.

a: Link Settling Procedure

In FIG. 12, the communication device 1 is a primary station, and the communication devices 2 through 7 are secondary stations. It is set up whether a device's own station is a primary station or a secondary station for each of the communication devices 1 through 7. In this case, the primary station is given a logical structure of the communication network shown in FIG. 13 and FIG. 14 and a route table in each communication device as initial information. But, the secondary station does not have this information before the settlement of links, and the route table is transferred from the primary station after the settlement of the links. In the hierarchical structure of the communication network shown in FIG. 13 and FIG. 14, the higher rank stations send out the link settling commands to the lower rank stations among adjacent communication devices, and adjacent lower rank stations return the link settling responses, thereby settling the links.

The lower rank stations can not carry out communication until the higher rank stations settle links. After the settlement of the links, the higher rank stations transmit commands at least once within a given period to their adjacent lower rank stations, and the lower rank stations return the responses for the commands.

In the case where the communication devices 1 through 3 transmit commands as higher rank stations to lower rank stations, the control units 11 through 13 of the communication devices 1 through 3 operate the circuit selecting switch units 21 through 23 and connect the lower rank transmitting-receiving units 311, 322, and 332 to the circuits connected to the communication devices 2 through 7 which become lower rank stations. For example, when the communication device 1 transmits a command to the communication device 2, the control unit 11 of the communication device 1 operates the circuit selective switch unit 21 and connects the lower rank transmitting-receiving unit 311 to the circuit 41. On the other hand, in the case where, after the settlement of the link, the communication devices 2 through 7 transmit responses as lower rank stations to higher rank stations, since the circuits leading to the communication devices 1 through 3, higher rank stations, are exclusively fixed, the control units do not operate the circuit selective switch units for the transmission of individual responses at all.

The procedure for deciding circuits led to communication devices, higher rank stations, in settling links will be described. At first, since the communication devices 4 through 7 are secondary stations each of which has only one circuit among the circuits 43, 44, 46, and 48 connected thereto, circuits connected to the higher rank transmitting-receiving units 341, 351, 361, and 371 are exclusively decided, not needing operation of the circuits. Accordingly, the communication devices 4 through 7 do not have their circuit selective switch units or select circuits fixedly even if they have the above units. For the same reason, for example, even if the communication device 5 had the lower rank transmitting-receiving unit 352, the transmitting-receiving unit is not usually used. Since the communication devices 2 and 3 are secondary stations each of which has a plurality of circuits connected thereto, they decide their circuits 41 and 42 led to the higher rank stations using the following procedure and settle links to the higher rank stations. Since which ones are circuits led to higher rank stations is not known before the settlement of links in the communication devices 2 and 3, a scan is performed, by which each circuit is connected to the higher rank transmitting-receiving units 321 and 331, for example, every given time t through the action of the circuit selective switch units 22 and 23 controlled by the control units 12 and 13 to wait for the reception of the commands. Once the commands are received and the links are settled, scanning of the circuits is stopped, and the circuits for which the link settling procedure are carried out are decided as the circuits led to the upper rank stations. On the other hand, in the case where a higher rank station is provided with one or a plurality of lower rank stations having links not yet be settled, since the controls units controls the circuit selective switch units, higher rank stations connects circuits led to adjacent lower rank stations having links not yet settled to lower rank transmitting-receiving units, for example, with a period of a given time T. Then, within the period T, the higher rank stations transmits link settling commands for the adjacent lower rank stations and then wait for responses for them. If responses can not be received within a given time S, the higher rank stations transmit link settling commands once more. Information on "for which circuits should be settled links ?" is set up in a route table. Since the route table is transferred to secondary stations from a primary station, higher rank stations knows this information. The retransmission of link settling commands is repeated up to the prescribed value of the number of times of the transmission retry which is possible within a period of time T. When the higher rank stations transmit link settling commands on circuits led to adjacent lower rank stations, if the concerned circuits and higher rank transmitting-receiving units are connected with each other in the concerned lower rank stations, the concerned lower rank stations receive commands, and consequently, they return responses to higher rank stations. Thus, links are settled. When the concerned lower rank stations connect circuits other than the concerned circuits to higher rank stations, the concerned lower rank stations can not receive link settling commands. But, if the circuit connecting time t and T of higher rank stations and lower rank stations and a time interval between the transmission and the retransmission of link settling commands are properly determined, it is possible to settle each link in a period of time T by circuit scanning in lower rank stations.

FIG. 17 is a flowchart showing a link settling operation for higher rank stations in the communication devices 2 and 3, both secondary stations to which a plurality of circuits are connected. Hereinafter, the operation will be described in accordance with the number affixed to each element of the flowchart.

Step 261: In accordance with a rule by which all circuits are selected in order (For example, in order from the smaller circuit number), circuits are selected in order, and circuit selective switch units are operated to connect circuits to higher rank transmitting-receiving units.

Step 262: A timer for detecting that link settling commands can not be received is started.

Step 263: The reception of link settling commands is waited for.

Step 264: If timeout of a timer which is started in Step 262 has occurred without receiving a link settling command, the step advances to Step 261 in order to select the next circuit.

Step 265: When a link settling command is received, the step advances to Step 266.

Step 266: A link settling response is returned to complete the execution of the link settling procedure.

Figure 18:
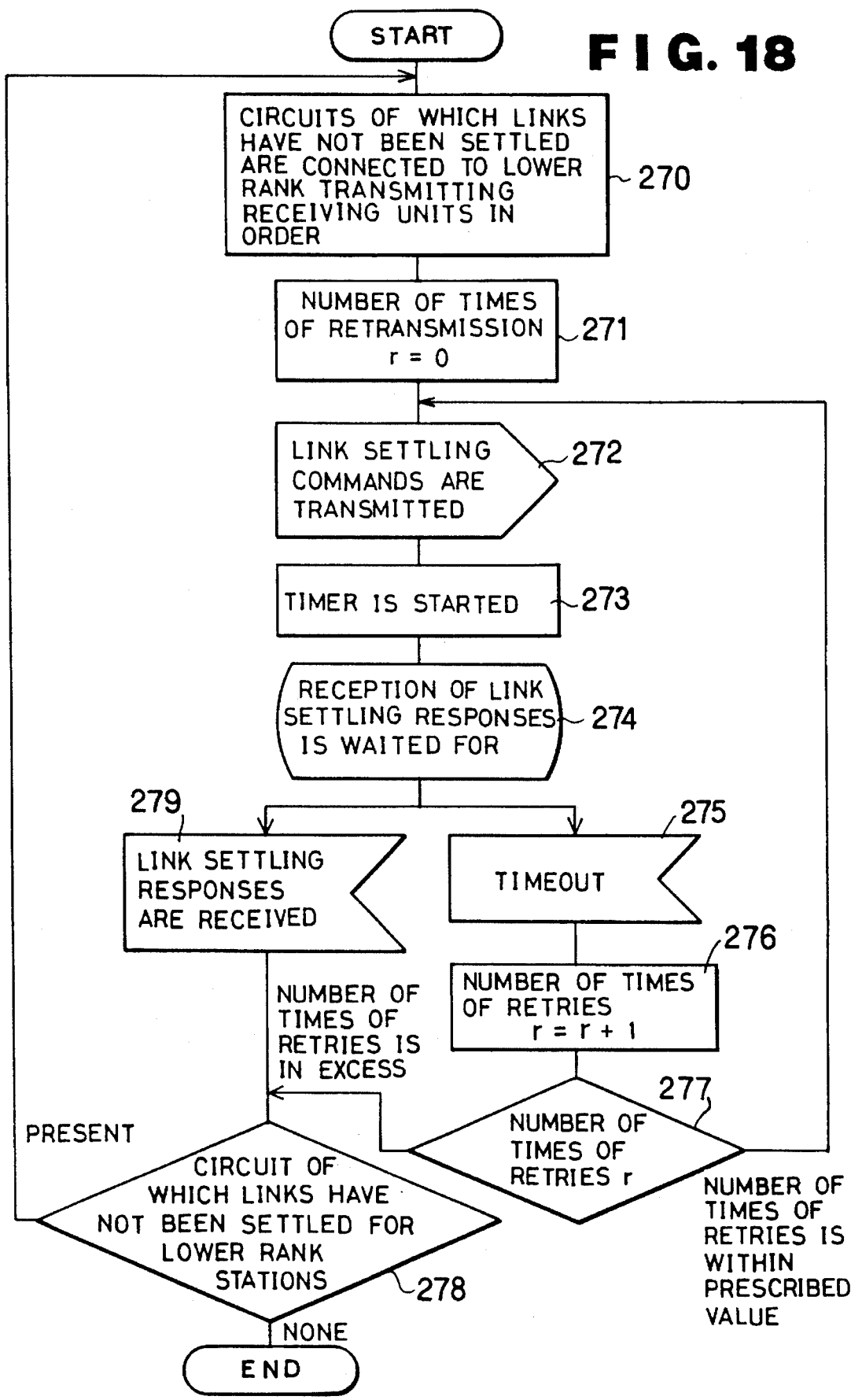

FIG. 18 is a flowchart showing a link settling operation for adjacent lower rank stations of higher rank stations. The operation shown in the flowchart of FIG. 18 sometimes is carried out simultaneously with a link monitoring operation for adjacent lower rank stations after the settlement of links (this has been already shown in FIGS. 11A and 11B). The operation shown in FIG. 18 is carried out in primary stations and secondary stations having lower rank.

Step 270: Circuits led to adjacent lower rank stations and not provided with links are selected in order in accordance with a rule by which circuits are selected in order (For example, in order from the small circuit number) and circuit selective switch units are operated to connect circuits to lower rank transmitting-receiving units.

Step 271: The number of times of the transmission retry is cleared.

Step 272: Link settling commands are transmitted.

Step 273: A timer for detecting that link settling responses can not be received is started.

Step 274: The reception of link settling responses is waited for.

Step 275: When link settling responses can not be received and time out occurs, the step advances to Step 276.

Step 276: The number of times of the transmission retry is cumulated (increment) by one.

Step 277: If the number of times of the transmission retry is not over the prescribed value, the step returns to Step 272 and repeats the retry. If the number of times of the transmission retry is over the prescribed value, the processing for the concerned circuit is stopped and the step advances to Step 278. The concerned circuit is regarded to be in a circuit trouble state, and made not to be a subject of subsequent link settling operations.

Step 278: The presence or absence of circuits led to adjacent lower rank stations and provided with links which have not been yet settled is checked. If circuits are "Absence", the step is completed. If circuits are "Presence", the step returns to Step 270 and link settling operations of circuits provided with links which have not been yet settled are continued.

Step 279: If link settling responses are received in a wait state for link settling responses, the link of the concerned circuit is settled. The step advances to Step 278 in order to check whether circuits which have not yet been settled remain or not.

b: Route Table Transfer Procedure and Routing Procedure

A route table is carried on a route table transfer packet and transferred to a secondary station from a primary station after links between secondary stations and higher rank stations have been settled. When other secondary stations are present between the primary station and the secondary station, the route table is transferred via other secondary stations to the secondary stations. The settlement of links and the transfer of the route table are carried out in order from higher rank stations to lower rank stations in accordance with a logical structure of the communication system networks which have been shown in FIG. 13 and FIG. 14. In other words, a link is, at first, settled between a primary station and a secondary station of a first class, and subsequently the route table is carried on a packet and transferred to the secondary station of a first class from the primary station. Next, a link is settled between the secondary station of a first class and a secondary station of a second class, and subsequently the route table is carried on the packet and transferred to the secondary station of a second class from the primary station via the secondary station of a first class. Hereafter, the same operation is carried out up to secondary stations of a lowest class. In the case where a route table is transferred to secondary stations of an i-th class from primary stations, secondary stations of a class lower than (i−1)th class through which route table transfer packets pass perform processing of routing for the route table transfer packets using the route table which has been already received.

FIG. 19 is a flowchart showing a receiving operation for a route table sent from a primary station after secondary stations have settled links for higher rank stations.

Step 281: Links for higher rank stations are settled by the operation shown in FIG. 17.

Step 282: The reception of route table transfer packet is waited for.

Step 283: Route table transfer packets transmitted from primary stations are received via higher rank stations. When the route table is large, a plurality of route table transfer packets may be transmitted.

Step 284: Circuits led to adjacent lower rank stations are selected in accordance with information in route tables.

Step 285: Links for adjacent lower rank stations are settled in accordance with the operation shown in FIG. 18.

Step 286: When the settlement of links for adjacent lower rank stations is completed, a link settlement notifying packet for giving notice of the settlement of links is transmitted via higher rank stations to primary stations.

FIG. 20 is an example of a format of a route table which is sent by being carried on route table transfer packets transmitted from primary stations to secondary stations. The route table is employed in order to decide circuit numbers to which packets are to be transferred from destination network addresses of packets or direct the settlement of links for adjacent lower rank stations from primary stations. In FIG.

20, lateral rows represent entries for one communication device. The entries comprise a network address of the concerned communication device, circuit numbers for specifying circuits led to adjacent communication devices among routes led to the concerned communication devices, a link settling direction flag showing whether or not it is necessary to settle links on the concerned circuits with own station acting as a master station for the circuit numbers, and an own station identification flag directing whether or not a data link address and a network address to be both set in the frame (Refer to FIG. 16) on the concerned link coincide with that of own station when a link setting direction flag is set. Since sometimes a packet having different destination network addresses is set out on one circuit, sometimes the same circuit number appears in the longitudinal column showing circuit numbers a plurality of times. On the other hand, since the link setting direction flag for one circuit is sufficient if it is set once, for example, the flag is set for the first one among circuit numbers which appear a plurality of the numbers of times.

Figure 21:
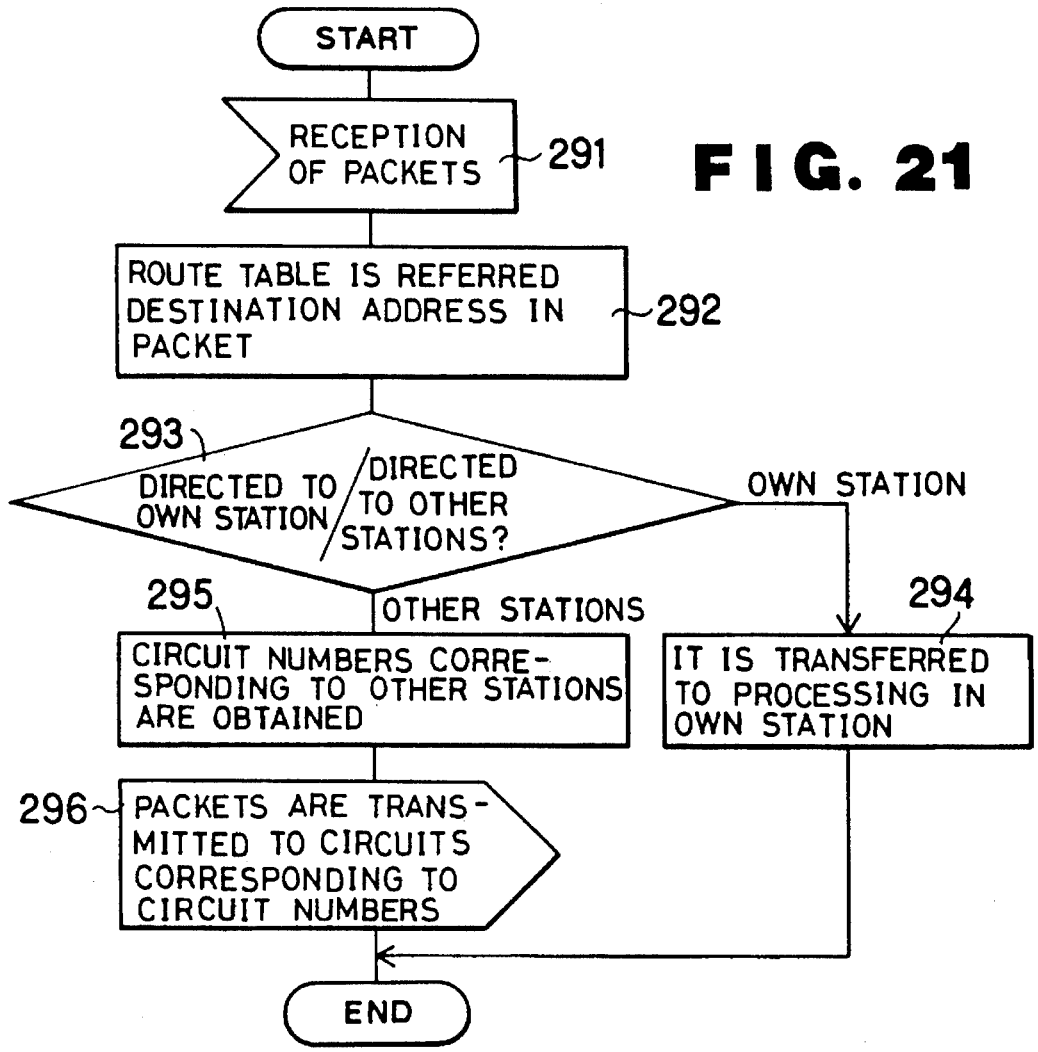

FIG. 21 is a flowchart showing an action of a routing procedure for transferring packets using a route table.

Step 291: A packet is received from a circuit.

Step 292: A route table is referred to using destination network addresses in the packet as a key.

Step 293: It is distinguished whether or not the packet is directed to own station from information corresponding the destination network address in the route table. For example, in the case where the route table has the format shown in FIG. 20, the value of the own station identification flag is set in an ON state at the entry containing network addresses for own station and the value of the own station identification flag is set in an OFF state. Then, it is possible for the packet to distinguish whether or not the packet is directed to own station by watching the value of the own station identification flag at the entry corresponding to the destination network address in the route table.

Step 294: If the packet is directed to own station, the concerned packet is forwarded to single-office processing for processing data in received packets.

Step 295: If the packet is directed to other stations, the circuit number of the circuit led to the destination station is obtained from the route table. In the route table shown in FIG. 20, the circuit number corresponding to the destination network address in the entry is taken out.

Step 296: The packet is transmitted to the circuit directed by the circuit number obtained in Step 295. In this time, the packet is affixed with the address unit 101 and the control unit 102 and set out on the circuit as the frame 220.

Figure 22:
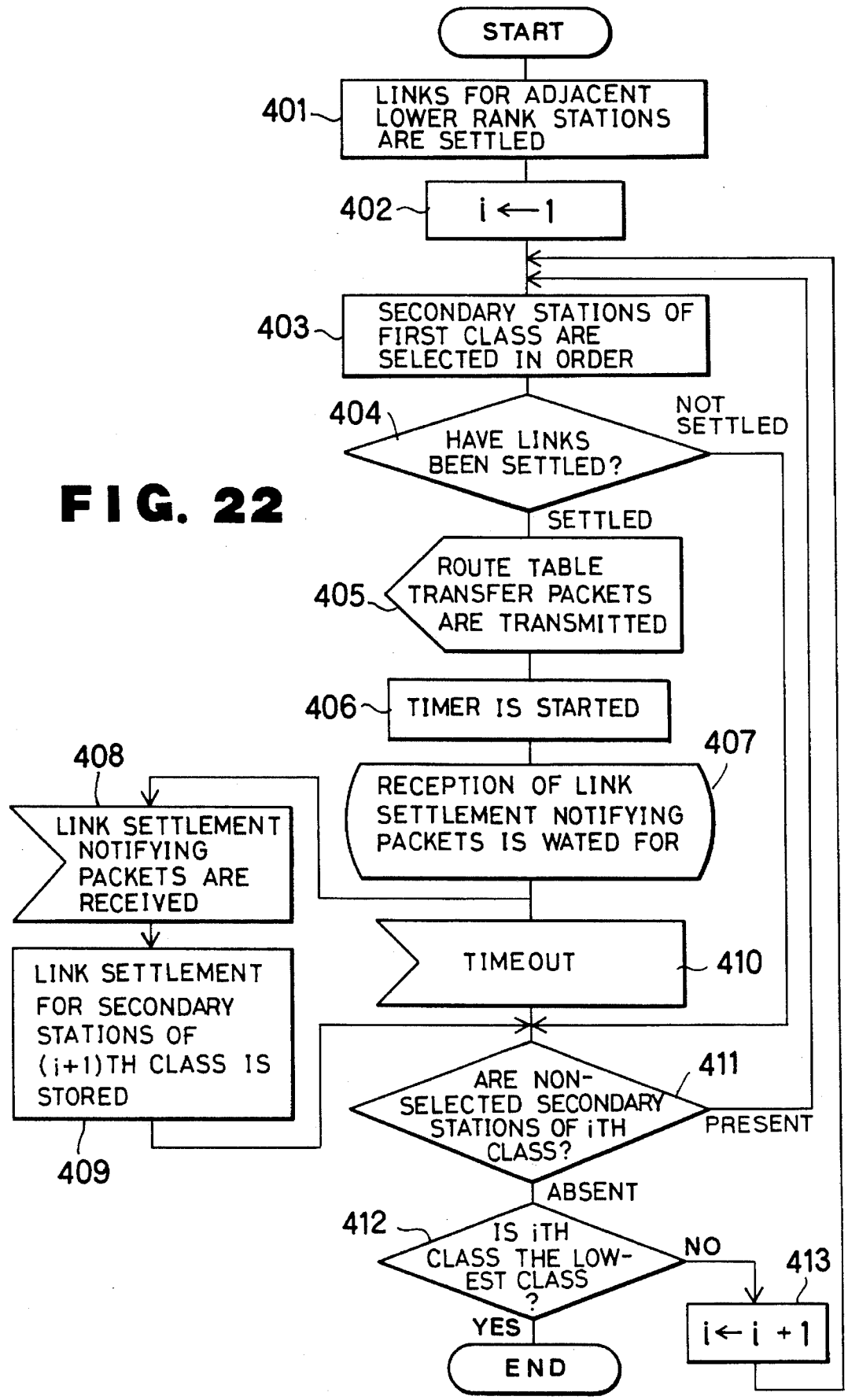

FIG. 22 is a flowchart showing an operation for transmitting a route table from primary station to each secondary station in order from the first class to the lowest class.

Step 401: Primary stations settles links for adjacent lower rank stations, that is, secondary stations of a first class. The detail of this processing is shown by the flowchart in FIG. 18.

Step 402: The initial value 1 is set to a variable i showing a class on which the secondary station, a destination of transfer of the route table is located.

Step 403: A secondary station is selected in accordance with the rule by which secondary stations of i-th class are selected in order (For example, in order from a small circuit number of circuits among secondary stations and adjacent higher rank stations).

Step 404: It is checked whether or not the concerned secondary station settles links for adjacent upper rank stations. If the result is "Settlement completed", the step advances to transfer processing of a route table, and if the result is "Settlement Not Yet", the step advances to Step 411 in order to check whether or not other secondary stations which can transfer the route table are present.

Step 405: The concerned route table transfer packet having the route table placed at the concerned secondary station in data is transmitted for the concerned secondary station.

Step 406: A timer which waits for a link settlement notifying packet is started.

Step 407: The reception of a link settlement notifying packet or occurrence of timeout is waited for.

Step 408: A link settlement notifying packet is received from secondary stations which have transferred a route table.

Step 409: Secondary stations of an (i+1)th class of which links have been settled are stored from information in a link settlement notifying packet. When Step 404 is carried out after the content of this memory is added with a variable i, they are referred to in order to check whether or not the links of the secondary stations have been settled.

Step 410: When a timeout occurs, it is assumed that the secondary stations have not settled links for adjacent lower rank stations, and then the step advances to the next processing.

Step 411: Whether or not secondary stations which have not been selected in the i-th class are present. If the result is "Present", the step returns to Step 403 in order to select one secondary station among secondary stations which have not been selected. If the result is "Absent", the step advances to Step 412 in order to check whether or not the transfer of the route table is completed.

Step 412: It is checked whether or not the i-th class which has finished the selection of all secondary stations is the lowest class. If Yes, the route table transfer action is completed, and if No, the step advances to Step 413 in order to start the route table transfer action to secondary stations of the (i+1)th class.

Step 413: The step returns to Step 403 by adding the value 1 to a variable i.

In Step 405, the transmission of a route table transfer packet is represented as one transmission processing. But, in the case where a capacity of a route table is large, the route table is divided, and divided one thereof may be carried on a plurality of packets and transferred in order.

c: Link Monitoring Procedure

A link monitoring procedure is carried out for detecting link troubles by monitoring that adjacent higher and lower rank stations transmit and receive the command response at least one time within a given time after links have been settled by the link settling procedure of which action has been shown in FIG. 17 and FIG. 18. When troubles are detected, the link settling procedure is started once more.

Figure 23:
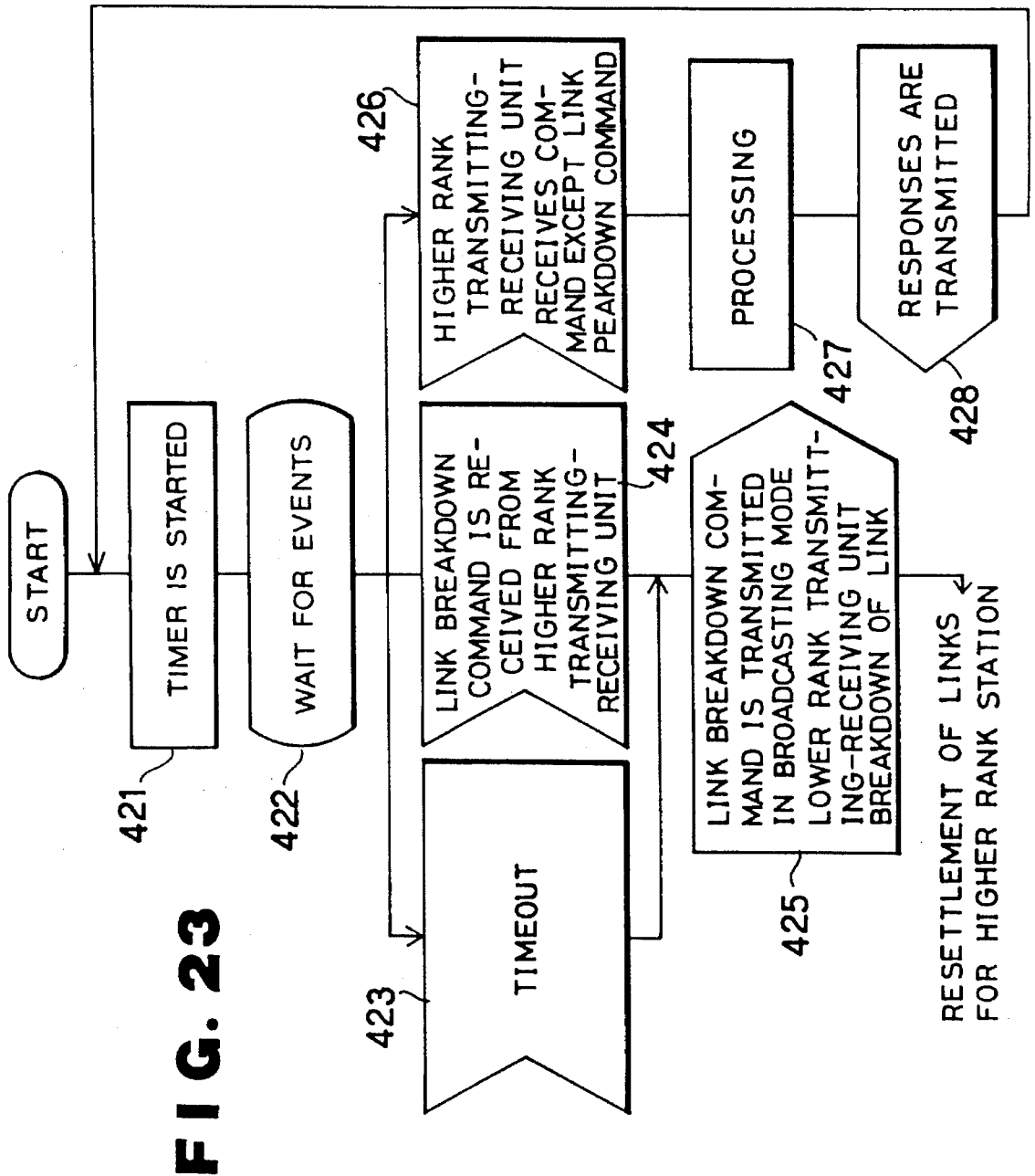

FIG. 23 is a flowchart showing the action that lower rank stations monitor links for higher rank stations.

Step 421: A timer for waiting for the reception of commands from higher rank stations is started.

Step 422: The reception of commands from higher rank stations or an occurrence of timeout.

Step 423: When a timeout occurs, the step turns to the processing in Step 425.

Step 424: When link breaking commands are received from higher rank transmitting-receiving units, the step turns to the processing in Step 425 in the same way as Step 423.

Step 425: A link disconnecting command is transmitted in a broadcasting mode from a lower rank transmitting-receiving unit to simultaneously disconnect all links for adjacent lower rank stations and at the same time, make adjacent lower rank stations transmit link disconnecting commands to secondary stations of further lower rank stations too. Further, the step is moved to the action shown in FIG. 17 in order to resettle links for higher rank stations.

Incidentally, the broadcasting mode is a function that if a special bit pattern is set up in the address section [Refer to FIG. 16 (101)] or the destination network address in the packet [Refer to FIG. 16 (226)] to transmit the frame or the packet, each station regards the frame or the packet as that directed to own station and receives it.

Step 426: In the case where a higher rank transmitting-receiving unit receives commands except link disconnecting commands, it is considered that the normal state of links can be confirmed, and the step advances to processing of receiving commands.

Step 427: The received commands are processed.

Step 428: Responses for the received commands are transmitted, and at the same time, the step returns to starting processing of a timer for monitoring the next commands which are received.

Furthermore, the transfer of the link disconnecting command shown in Step 424 and Step 425 has an effect that when faults occur, faulty parts in a network are disconnected to prevent malfunction.

The action by which higher rank stations monitor links for lower rank stations comply with the flowchart shown in FIGS. 11A and 11B in the same way as the case of the first embodiment. In the case where there are present a plurality of links which higher rank stations monitor, action in FIGS. 11A and 11B is carried out independently for each link simultaneously in the same way as the case of the first embodiment.

Incidentally, in the embodiment, a method by which adjacent higher rank stations and lower rank stations exchange commands and responses is shown (Refer to FIG. 11) as a link monitoring procedure. Instead of the method, it is possible to realize a method by which primary stations periodically exchange monitoring packets and response packets directly with secondary stations for detecting faults. In this case, each secondary station receives monitoring packets and returns response packets, and at the same time, it provides a timer for waiting for monitoring packets. After each secondary stations disconnect links for lower rank stations at its timeout, it moves to a link resettling action (Refer to FIG. 17) for higher rank stations. On the other hand, a primary station transmits monitoring packets to each secondary station periodically and receives response packets, and at the same time, provides a timer for waiting for response packets and a retry counter. When the reception of response packets is subjected to a retryout, the primary station starts resettling action of adjacent lower rank stations for the concerned secondary stations (Refer to FIG. 18) by notifying the detection of link faults to adjacent higher rank stations of the concerned secondary stations.

What is claimed is:

1. A system of communication devices connectable with each other via a plurality of connection circuits, each communication device comprising:

a transmitting-receiving unit which transmits and receives communication signals to and from other communication devices, said communication signals being in the form of data frames having address sections and information sections;

a circuit selective switch unit connected between said transmitting-receiving unit and at least one of said plurality of connection circuits for selectively establishing a communication link between said transmitting-receiving unit and at least one of said other communication devices via said at least one connection circuit and the circuit selective switch unit of said one other communication device; and a control unit which controls the operation of said circuit selective switch unit and said transmitting-receiving unit for carrying out communications with selected communication devices according to an initial communication link establishment procedure executed by said system;

wherein one of said communication devices is a primary station, the circuit selective switch unit of said primary station being connected to a subset of at least two of said plurality of connection circuits, said control unit of said primary station including means for selecting at least one of said subset of connection circuits for establishing a communication link with at least one other communication device as a secondary station, and means for establishing said communication link after said at least one connection circuit has been selected;

wherein said selecting means simultaneously selects at least two connection circuits from said subset of connection circuits for establishing a communication link with at least two other communication devices as secondary stations.

2. A system of communication devices connectable with each other via a plurality of connection circuits, each communication device comprising:

a transmitting-receiving unit which transmits and receives communication signals to and from other communication devices, said communication signals being in the form of data frames having address sections and information sections;

a circuit selective switch unit connected between said transmitting-receiving unit and at least one of said plurality of connection circuits for selectively establishing a communication link between said transmitting-receiving unit and at least one of said other communication devices via said at least one connection circuit and the circuit selective switch unit of said one other communication device; and a control unit which controls the operation of said circuit selective switch unit and said transmitting-receiving unit for carrying out communications with selected communication devices according to an initial communication link establishment procedure executed by said system;

wherein one of said communication devices is a primary station, the circuit selective switch unit of said primary station being connected to a subset of at least two of said plurality of connection circuits, said control unit of said primary station including means for selecting at least one of said subset of connection circuits for establishing a communication link with at least one other communication device as a secondary station, and means for establishing said communication link after said at least one connection circuit has been selected;

wherein the circuit selective switch unit of said secondary station communication device is connected to at least a subset of said plurality of connection circuits, the control unit of said secondary station communication device comprising:

means for initially selecting all connection circuits connected to said circuit selective switch unit;

means for receiving a command from said primary station specifying a connection circuit to be selected in a communication link; and means for selecting only said specified connection circuit for communication with said primary station.

3. A system of communication devices as recited in claim 2, wherein said control unit of said secondary station communication device further comprises:

means for establishing a communication link with said primary station through said selected specified connection circuit; and means for monitoring reception of commands from said primary station and transferring processing to said means for initially selecting when no commands from said primary station have been received within a predetermined time period.

4. A system of communication devices connectable with each other via a plurality of connection circuits, each communication device comprising:

a transmitting-receiving unit which transmits and receives communication signals to and from other communication devices, said communication signals being in the form of data frames having address sections and information sections;

a circuit selective switch unit connected between said transmitting-receiving unit and at least one of said plurality of connection circuits for selectively establishing a communication link between said transmitting-receiving unit and at least one of said other communication devices via said at least one connection circuit and the circuit selective switch unit of said one other communication device; and a control unit which controls the operation of said circuit selective switch unit and said transmitting-receiving unit for carrying out communications with selected communication devices according to an initial communication link establishment procedure executed by said system;

wherein said communication devices are connected in a tree-like logical communication system configuration in which one of said communication devices is used as a primary station and the other communication devices are used as multiple rank secondary stations;

said primary station being used only as a highest rank station and including only a lower rank transmitting-receiving unit for communicating with lower rank communication devices;

middle rank secondary stations including a higher rank transmitting-receiving unit for communicating with higher rank communication devices and a lower rank transmitting-receiving unit for communicating with lower rank communication devices; and lower rank secondary stations including only a higher rank transmitting-receiving unit for communicating with higher rank communication devices.

5. A system of communication devices as recited in claim 4, wherein said control unit of each of said communication devices includes means for transferring a route table to lower rank communication devices, which route table determines transfer destinations for information packets sent over said system.

* * * * *

UNITED STATES PATENT AND TRADEMARK OFFICE
CERTIFICATE OF CORRECTION

PATENT NO.   : 5,455,568
DATED        : October 3, 1995
INVENTOR(S)  : Tatsuki Ichihashi et al.

It is certified that error appears in the above-indentified patent and that said Letters Patent is hereby corrected as shown below:

Col. 1, line 14, after "simplified" insert -- block --; Col. 1, line 28, delete "settle"; Col. 1, line 36, delete "settle"; Col. 1, line 41, delete "like"; Col. 1, line 51, after "decides" insert a comma; Col. 4, line 10, delete "the"; same line, "a" should be -- the --; Col. 5, line 18, after "stations" insert a comma; Col. 5, line 33, delete "carrying" (first occurrence); same line, after the comma, insert -- and --; Col. 6, line 32, after "stations" insert a comma; Col. 6, line 47, delete "a"; Col. 7, line 20, before "flowchart" insert -- a --; same line, after "showing", delete "a"; Col. 7, line 49, before "own" insert -- its --; same line, before "station", delete "its"; Col. 9, line 33, "line" should be -- link --; Col. 10, line 23, "figure" should be -- FIG. 12 --; Col. 12, line 49, "controls" (second occurrence) should be -- control --.

Signed and Sealed this

Sixteenth Day of July, 1996

*Attest:*

BRUCE LEHMAN

*Attesting Officer*     Commissioner of Patents and Trademarks